United States Patent
Venkataramani et al.

(10) Patent No.: US 10,157,045 B2
(45) Date of Patent: Dec. 18, 2018

(54) SYSTEMS AND METHODS FOR AUTOMATICALLY GENERATING CODE FOR DEEP LEARNING SYSTEMS

(71) Applicant: The MathWorks, Inc., Natick, MA (US)

(72) Inventors: Girish Venkataramani, Cambridge, MA (US); Rama P. Kokku, Natick, MA (US); Jayaprabha Shankar, Natick, MA (US); James L. Brock, Kingston, NH (US); Chun-Yu Shei, Allston, MA (US); Vijaya Raghavan, Brookline, MA (US); Yaohung Tsai, Knoxville, TN (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/816,606

(22) Filed: Nov. 17, 2017

(65) Prior Publication Data
US 2018/0136912 A1    May 17, 2018

Related U.S. Application Data

(63) Continuation of application No. PCT/US2017/062088, filed on Nov. 16, 2017.
(Continued)

(51) Int. Cl.
*G06F 8/35* (2018.01)
*G06N 3/10* (2006.01)
(Continued)

(52) U.S. Cl.
CPC ............. *G06F 8/35* (2013.01); *G06F 8/30* (2013.01); *G06F 9/44563* (2013.01); *G06N 3/04* (2013.01);
(Continued)

(58) Field of Classification Search
CPC ... G06F 8/35; G06F 8/24; G06F 8/315; G06F 8/47; G06F 9/44563; G06N 99/005;
(Continued)

(56) References Cited

U.S. PATENT DOCUMENTS

2014/0330763 A1*  11/2014  Hunt ..................... G06N 3/105
                                                          706/42
2015/0100529 A1*   4/2015  Sarah .................... G06N 3/10
                                                          706/25
2016/0328644 A1   11/2016  Lin et al.

OTHER PUBLICATIONS

Tokui et al., "Information processing device and information processing method", WO JP2016/004027 W, Filed on Sep. 2, 2016.*
(Continued)

*Primary Examiner* — Dave Misir
(74) *Attorney, Agent, or Firm* — Cesari and McKenna, LLP.; Michael R. Reinemann

(57) ABSTRACT

Systems and methods may automatically generate code for deep learning networks. The systems methods may provide a code generation framework for generating target specific code. The code generation framework may include one or more predefined class hierarchies for constructing objects of the generated code. The objects of the class hierarchies may provide an interface to predefined libraries of deep learning functions optimized for use on a target platform. The systems and methods may perform one or more optimizations on the code being generated.

50 Claims, 17 Drawing Sheets

Related U.S. Application Data

(60) Provisional application No. 62/423,446, filed on Nov. 17, 2016, provisional application No. 62/492,240, filed on Apr. 30, 2017, provisional application No. 62/514,565, filed on Jun. 2, 2017, provisional application No. 62/557,560, filed on Sep. 12, 2017.

(51) Int. Cl.
    *G06F 9/445*  (2018.01)
    *G06N 3/08*   (2006.01)
    *G06N 3/04*   (2006.01)
    *G06F 8/30*   (2018.01)
    *G06F 8/20*   (2018.01)

(52) U.S. Cl.
    CPC .............. *G06N 3/08* (2013.01); *G06N 3/10* (2013.01); *G06F 8/20* (2013.01)

(58) Field of Classification Search
    CPC .. G06N 3/04; G06N 3/08; G06N 3/10; G06K 9/4628
    USPC .......................................................... 706/25
    See application file for complete search history.

(56) References Cited

OTHER PUBLICATIONS

Kato et al., "Installation device and installation method", WO JP2016/004028 W, Filed on Sep. 2, 2016.*

Andersch, Michael, "Inference: The Next Step in GPU-Accelerated Deep Learning," Parallel Forall, NVIDIA Corporation, <https://devblogs.nvidia.com/parallelforall/inference-next-step-gpu-accelerated-deep-learning/>, Nov. 11, 2015, pp. 1-8.

Beale, Mark Hudson, et al., "Neural Network Toolbox™ User's Guide," R2017a, The MathWorks, Inc., Mar. 2017, pp. 1-446.

Gray, Allison, et al., "Production Deep Learning with NVIDIA GPU Inference Engine," Parallel Forall, NVIDIA Corporation, <https://devblogs.nvidia.com/parallelforall/production-deep-learning-nvidia-gpu-inference-engine/>, Jun. 19, 2016, pp. 1-13.

"Intel's Optimized Tools and Frameworks for Machine Learning and Deep Learning," Intel Corporation, <https://software.intel.com/en-us/articles/intel-s-optimized-tools-and-frameworks-for-machine-learning-and-deep-learning>, Dec. 13, 2016, pp. 1-6.

Knight, Joss, "Calling CUDA-accelerated Libraries from MATLAB: A Computer Vision Example," Parallel Forall, NVIDIA Corporation, < https://devblogs.nvidia.com/parallelforall/calling-cuda-accelerated-libraries-matlab-computer-vision-example/ >, Jul. 29, 2014, pp. 1-15.

Beale, Mark Hudson, et al., "Neutral Network Toolbox™: User's Guide," R2016b, The MathWorks, Inc., Sep. 2016, pp. 1-416.

Beale, Mark Hudson, et al., "Neutral Network Toolbox™: User's Guide," R2017b, The MathWorks, Inc., Mar. 2017, pp. 1-446.

"Notification of Transmittal of the International Search Report and the Written Opinion of the International Searching Authority, or the Declaration," International Filing Date: Nov. 16, 2017, International Application No. PCT/US2017/062088, Applicant: The MathWorks, Inc., dated Mar. 14, 2018, pp. 1-13.

Yan, Zhicheng, et al., "HD-CNN: Hierarchical Deep Convolutional Neutral Network for Image Classification," arXiv, Retrieved from the Internet: <https://arxiv.org/pdf/1410.0736v2.pdf>, Retrieved om Dec. 9, 2016, Dec. 19, 2014, pp. 1-12.

* cited by examiner

SYSTEMS AND METHODS FOR AUTOMATICALLY GENERATING CODE FOR DEEP LEARNING SYSTEMS

CROSS-REFERENCE TO RELATED APPLICATIONS

This application is a continuation of International Application No. PCT/US2017/062088 filed Nov. 16, 2017, which claims the benefit of U.S. Provisional Patent Application Ser. No. 62/423,446 filed Nov. 17, 2016 for GENERATING CODE FOR GRAPHICAL PROCESSING UNITS (GPU) by Girish Venkataramani, Rama Kokku, Jayaprabha Shankar, James L. Brock, Chun-Yu Shei, and Vijaya Raghavan, U.S. Provisional Patent Application Ser. No. 62/492,240 filed Apr. 30, 2017 for SYSTEMS AND METHODS FOR AUTOMATICALLY GENERATING CODE FOR DEEP LEARNING SYSTEMS by Girish Venkataramani, Rama Kokku, Jayaprabha Shankar, James L. Brock, Chun-Yu Shei, Vijaya Raghavan, and Yaohung Mike Tsai, U.S. Provisional Patent Application Ser. No. 62/514,565 filed Jun. 2, 2017 for SYSTEMS AND METHODS FOR AUTOMATICALLY GENERATING CODE FOR DEEP LEARNING SYSTEMS by Girish Venkataramani, Rama Kokku, Jayaprabha Shankar, James L. Brock, Chun-Yu Shei, Vijaya Raghavan, and Yaohung Tsai, U.S. Provisional Patent Application Ser. No. 62/557,560 filed Sep. 12, 2017 for SYSTEMS AND METHODS FOR AUTOMATICALLY GENERATING CODE FOR DEEP LEARNING SYSTEMS by Girish Venkataramani, Rama Kokku, Jayaprabha Shankar, James L. Brock, Chun-Yu Shei, Vijaya Raghavan, and Yaohung Tsai, which applications are hereby incorporated by reference in their entireties.

COMPUTER PROGRAM LISTING

A portion of the disclosure of this patent document contains material that is subject to copyright protection. The copyright owner has no objection to facsimile reproduction by anyone of the patent document for the patent disclosure, as it appears in the United States Patent and Trademark Office patent file or records, but otherwise reserves all copyright rights whatsoever. Copyright © 2017 The MathWorks, Inc.

BRIEF DESCRIPTION OF THE DRAWINGS

The description below refers to the accompanying drawings, of which.

DETAILED DESCRIPTION OF AN ILLUSTRATIVE EMBODIMENT

Deep learning refers to a class of machine learning used to perform complex tasks, such as recommendation engines, object detection, image classification, speech recognition, etc. Deep learning is typically performed using a computer program that implements a Deep Neural Network. A neural network refers to a computer program or algorithm that includes processing nodes arranged in layers. The first layer, also called the input layer, receives the input data to be processed, e.g., classified. The last layer, also called the output layer, provides the classification of the input data. The layers in between the input and output layers are called the hidden layers of the neural network. A Deep Learning (DL) network refers to a neural network having more than one, often many possibly even hundreds, of hidden layers.

Examples of DL networks include Deep Neural Networks (DNNs), Convolutional Neural Networks (CNNs or ConvNets), Region-based CNNs (R-CNNs), Residual Neural Networks (ResNets), Fully Convolutional Networks (FCNs), Deconvolutional Neural Networks (DeconvNets), and Recurrent Neural Networks (RNNs), such as Long Short Term Memory (LSTM), and Generative Adversarial Networks (GANs), among others. DL networks are a widely used tool for implementing deep learning programs used to classify images, text, audio, speech, etc. In some embodiments, the layers of a DL network may include convolutional layers, rectified linear unit layers, max-pooling or average-pooling layers, normalization layers, and fully-connected layers, among others. The architecture of a particular DL network, for example the number and type of layers and their order in the DL network, can vary depending on the application and/or input data being classified.

The layers of a DL network may include nodes arranged in multiple dimensions. For example, in a four dimensional (4D) DL network, the dimensions may be batch sizes (N), width (W), height (H), and channels (C) or depth. Each layer may transform input to output for processing by the next layer of the DL network. In the example of image data, the value of width may be the width of the image or a portion thereof, the value of height may be the height of the image or a portion thereof, and in the example of color images the value of channels or depth may be three, corresponding to the Red, Blue, and Green (RBG) color channels. For a gray scale image, the value of channels or depth may be one. The nodes of some layers of the CNN, such as the convolution and pooling layers, are often only connected to a small region of the layer before it, instead of all of the neurons in a fully-connected manner. This small region is sometimes referred to as a feature map. The data passed between hidden layers of a DL network may be of any size.

Figure 1:
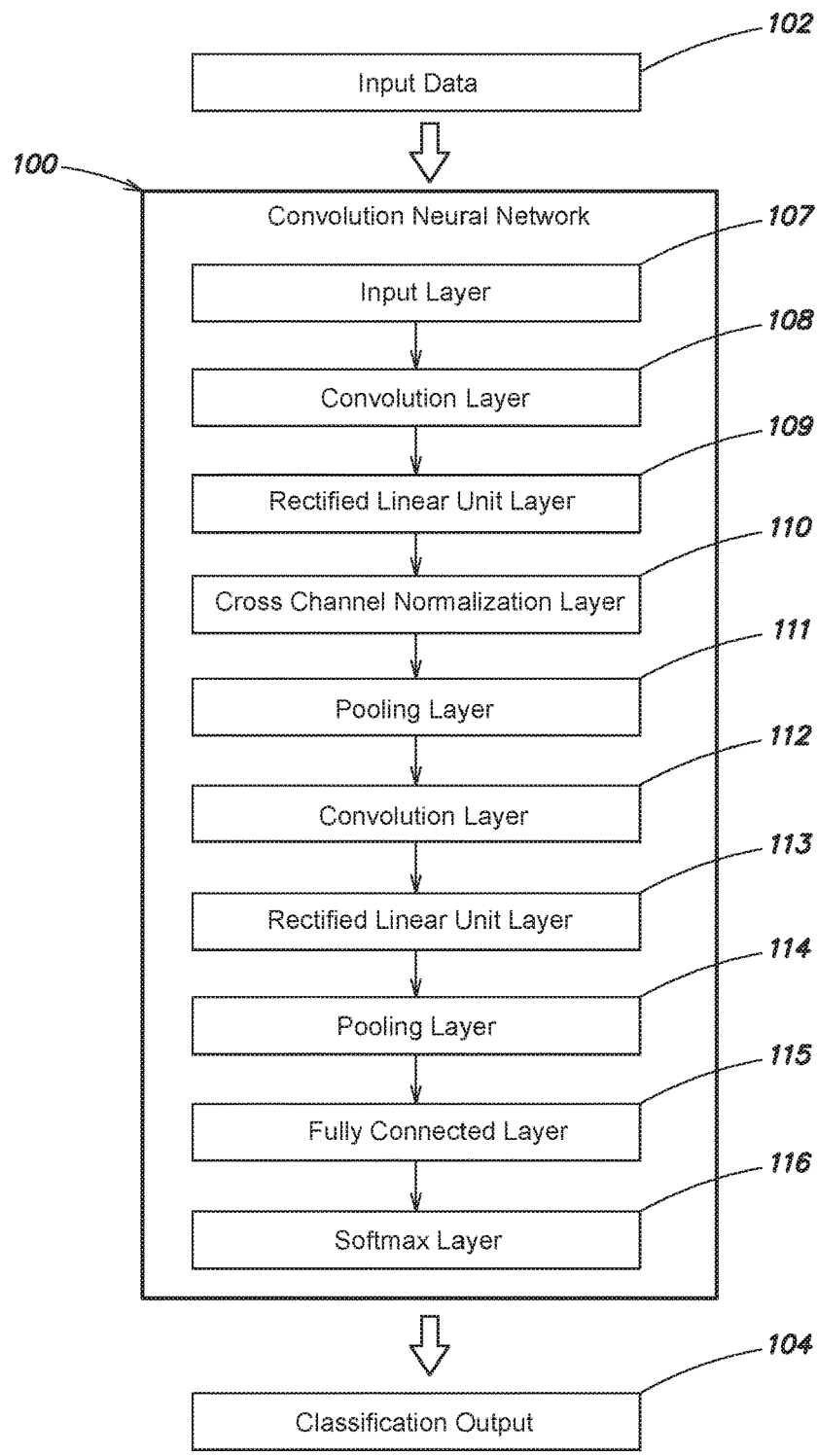
FIG. 1 is a schematic illustration of an example Convolution Neural Network (CNN) in accordance with an embodiment.

FIG. 1 is a schematic illustration of an example DL network 100 for use in classifying input data, such as images. The network can also be used for other classifications. The DL network 100 may receive input data 102, such as one or more images, and may generate a classification output 104, e.g., labels for the input images. The DL network 100 may include a plurality of layers. For example, the DL network 100 may include an input layer 107, which may perform data augmentation, such as flipping or cropping the input data 102, and/or data transformation, for example to reduce overfitting. The DL network 100 may further include a convolution layer 108, a rectified linear unit (ReLU) layer 109, a cross channel normalization layer 110, a pooling layer 111, another convolution layer 112, another ReLU layer 113, another pooling layer 114, a fully connected layer 115, and a Softmax layer 116. It should be understood that the DL network may include other layers.

In some implementations, the nodal outputs of at least some of the layers of the DL network 100 may be collected in a feature map that may be processed by the next layer of the DL network 100. The convolution layers 108 and 112 may transform an input feature map to an output feature map. Convolution can sometimes be considered to be a filter; and the convolution layers 108 and 112 can filter an input feature map for information of interest. For example, one of the convolution layers, such as layer 108, may filter an input feature map for edges, and discard other information. In some embodiments, the ReLU layers 109 and 113 may perform threshold operations, such as setting input values less than zero to zero. Nonetheless, it should be understood that layers implementing other activation functions besides and/or in addition to ReLU may be included in the DL network 100, including linear also referred to as identity function and non-linear activation functions, such as Sigmoid, Tansig, Tan h, leaky ReLU, and clipped ReLU, among others. The cross channel normalization layer 110 may replace input elements with normalized values. Nonetheless, it should be understood that layers implementing other regularization techniques, such as Batch normalization, dropout, etc., may be included in the DL network 100. The pooling layers 111 and 114 may perform downsampling. For example pooling layer 111 may return the maximum values of regions of its input, while pooling layer 114 may return the average values. Nonetheless, layers implementing other pooling techniques besides max-pooling and average-pooling may be included, such as L2 pooling. The fully connected layer 115 may combine all of the features, e.g., local information, learned by the previous layers, for example to identify larger patterns in the input images, as compared to patterns identified in feature maps by the convolution layers 108 and 112. The Softmax layer 116 may perform an activation function, for example to generate a value between 0 and 1 for each node of the Softmax layer 116. For a given input image, the values generated by the Softmax layer 116 may be interpreted as relative measurements of how likely it is that the image falls into each target class. A classification or other layer may follow the Softmax layer 116. At least some of the layers, such as the convolution layers 108 and 112, may have adjustable network parameters, such as weights and biases.

The layers of the DL network 100 are meant for illustrative purposes only. For example, a DL network may take other forms. In some embodiments, a DL network may be in the form of a Directed Acyclic Graph (DAG) network that includes branches and merges in the topology, or a Long Short Term Memory (LSTM) form of recurrent neural network, among others. It should also be understood that a DL network may include additional and/or other layers. For example, a DL network also may include one or more dropout layers, which may randomly set input elements to zero, and is used during training. A regression layer may be included in a DL network designed to solve regression problems.

After a DL network is created, it may be trained. A DL network may be trained using training data. For supervised training of a DL network, the training data is labeled with the actual classifications or results. For unsupervised training, the training data is not labeled. Before training, the DL network's adjustable network parameters may be set to default or initial values. During training, the DL network tunes the adjustable network parameters to particular values. The training data may be run forward through the DL network, e.g., from the input layer to the output layer. Because the tuning of a given network parameter to make a correct prediction may result in a previously correct prediction becoming incorrect, it often takes many iterations and a large set of training data to train a DL network, e.g., to converge on values for the network parameters. Once trained, a DL network may be used to predict input data. For example, the trained DL network may be deployed and run on a deployed system, such as a host system, an embedded platform, a data-center, or a cloud-computing platform or service, among others.

A DL network may have millions of network parameters and may perform billions of arithmetic operations to classify input data, such as an image. For example, the well-known AlexNet CNN, which classifies images to 1000 categories, has 61 million parameters and performs one and a half billion operations to classify one image. Running DL networks thus impose enormous memory and computation power demands on the deployed system.

A workflow for deep learning systems may include:

1. Define a Deep Learning (DL) network, its topology, the layer-types used, etc.;

2. Train the network, i.e., learn the weights and parameters of the DL network's different layers; and 3. Test/prediction on the DL network, e.g., once trained, the DL network can be tested on real-world inputs, for example to see how well it can predict/classify its inputs.

Several frameworks exist that facilitate the creation and training of DL networks. Exemplary frameworks include Caffe, Torch, TensorFlow, Darknet, Lightnet, Theano, Microsoft Cognitive Toolkit (CNTK), and MATLAB and Neural Network Toolbox (NNT), among others.

Once the DL network is trained in a framework, it may be deployed, e.g., installed and embedded into the end platform. Once deployed, the DL network may be responsible for only doing prediction, e.g., task #3 above, which may include classification on real-world inputs.

A challenge is that the end platform may be varied, for example it could be:

a) an embedded device that uses an embedded processor, e.g., Nvidia's Tegra GPU, Raspberry Pi, ARM-based hardware, Texas Instruments (TI) DSP hardware, etc.;

b) a desktop environment, e.g., an industrial computer using Intel Xeon processors and/or Nvidia Titan X GPUs;

c) a cluster environment, e.g., deployed to multiple CPUs/GPUs connected together in a dedicated cluster;

d) a cloud environment, e.g., on Amazon Web Services (AWS), Microsoft Azure, etc.; or e) dedicated ASIC, e.g., Google's Tensor Processing Unit (TPU).

For each of these different end platforms, the implementation of the DL network should be different to be fully optimized for that platform. Further, new layer types, such as new CNN layer types, are being developed for DL networks. As these new types of layers are added to DL networks, problems in implementing and optimizing new layer types can be exacerbated as there are multiple platforms for which the new layer type needs to be optimized.

SUMMARY

Briefly, the present disclosure relates to systems and methods to automatically generate optimized code for deploying a trained Deep Learning (DL) network to an end platform. The systems and methods may automatically generate code for a DL network that is retargetable, e.g., can support different hardware platforms/architectures, scalable, e.g., can add implementations for new network layers and new hardware platforms/architectures, and efficient, e.g., optimized in terms of processing, memory and/or other hardware resources for a specific hardware platform/architecture being targeted. Examples of platforms are different GPUs (e.g., Nvidia GPUs, ARM Mali GPUs, AMD GPUs, etc.), different forms of CPUs (e.g., Intel Xeon, ARM, TI, etc.), and programmable logic devices, such as Field Programmable Gate Arrays (FPGAs).

Figure 14:
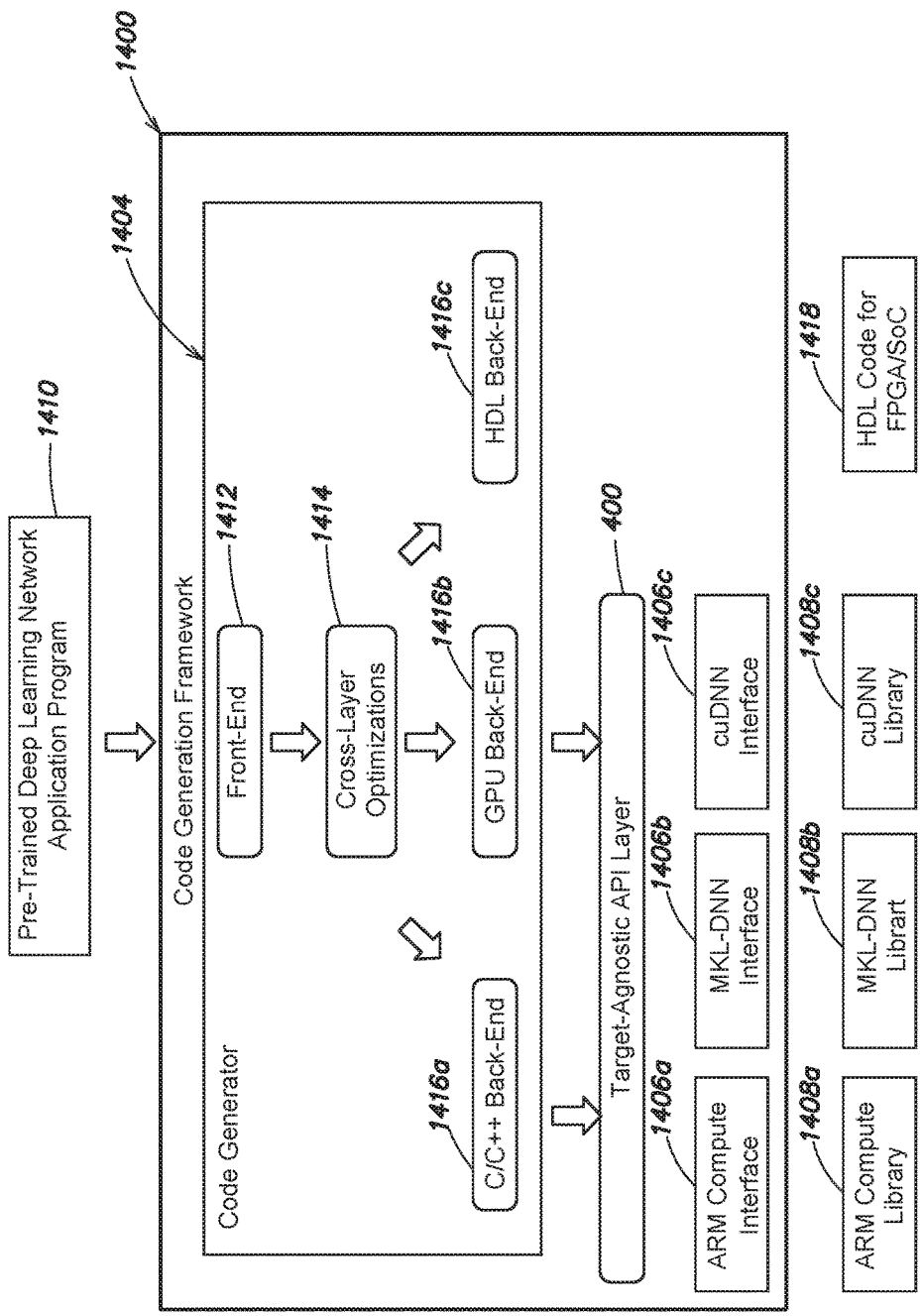
FIG. 14 is a schematic illustration of a code generation framework in accordance with an embodiment.

The systems and methods may be implemented as a deep learning compiler framework. FIG. 14 is a schematic illustration of a deep learning compiler framework 1400 in accordance with an embodiment. The framework 1400 may include an Application Programming Interface (API) layer 400 that is platform-agnostic. A code generator 1404 may target the target-agnostic API layer 400. For retargetability, the systems and methods may maintain multiple implementations of the target agnostic API layer 400, e.g., one or more for each hardware platform. An implementation of the target agnostic API layer 400 for a given platform may be tied to interfaces, such as interfaces 1406*a-c*, provided by the platform, e.g., targeting Nvidia GPUs may mean the implementation may use CUDA libraries, such as Nvidia's cuDNN 1408*c* and CUDA intrinsics. For a platform including Intel Xeon, the systems and methods may use Intel intrinsics, which may be assembly-coded functions accessed by C++ function calls, and Intel libraries, such as the MKL DNN library. Intrinsics may be expanded inline in generated code, for example to eliminate function call overhead. The systems and methods also may include an MKL-DNN interface 1406*b* to use Intel libraries, such as MKL DNN library 1408*b*. An ARM Compute interface 1406*a* may be used for an ARM Compute library 1408*a*. The code generator 1404 may always target the target-agnostic API layer 400. The code generation package that is compiled, however, may be linked against the platform-specific implementation, e.g., interfaces 1406. In some embodiments, targeting a new hardware platform may simply involve creating a new implementation 1406 for the target agnostic API layer 400 for the new hardware platform.

To generate code that is efficient and/or optimized, the systems and methods may create efficient implementations of a pre-trained deep learning network application program 1410 by creating optimized implementations for each specific target that uses the libraries for that platform (e.g., cuDNN or MKL DNN, etc.) and intrinsics for that platform (e.g., CUDA intrinsics or Intel Advanced Vector Extensions (AVX), ARM Neon instructions, etc.). Code that is high-performance may be generated specific to each platform by the systems and methods.

The systems and methods allow for multiple platform-specific implementations to exist. In addition, for the same platform, there may be multiple implementations of the same DL network layer. Support for a new layer may be provided by simply adding a new implementation for the new layer in each of the platform-specific API layer implementations.

The target agnostic API layer 400 may be structured to optimize a trained DL network for a forward prediction call. This mode of operation implies that there may be some initial setup necessary (e.g., allocating memory, setting up system resources, such as library handles, etc.), and then the DL network is in a live, real-time prediction or classification mode, wherein the allocated memory may be used to execute each layer of the DL network. This classification mode may be executed on a number of inputs, such as images. Once prediction is complete, the system may shut down and may perform cleanup (e.g., free allocated memory, release system resources, etc.). To facilitate forward prediction by a DL network, the API layer may define three main phases: setup, predict, and cleanup.

The framework 1400 may be implemented at least in part through a class hierarchy that may include a base class for a DL network layer and sub-classes that implement different types of layers of a DL network. The framework, class hierarchy, and/or API layer may be expressed in form of a C++ class hierarchy. In other embodiments, it may be in a C, Python, Julia, or other form. For example, instead of the class hierarchy, the functionality may be implemented using C and function pointers. The base Layer class may be used to support polymorphism, and may facilitate managing the subclass types. The subclass types may represent and may be used to implement different types of layers of the deep learning network, such as convolution, pooling, normalization, classifying, etc. The subclass types may support a plurality of methods or functions. Examples of methods or functions can include a setup method for performing initialization operations, such as allocating memory and loading network parameters for the respective layer, a predict method for performing the layer's respective operation, and a cleanup method for freeing up memory and other system resources. The base Layer class and a plurality of subclass types may be defined in a manner that is independent of any particular target platform, e.g., they may be target-platform agnostic. For example, the subclass types may be defined to implement the functionality of the layers of the deep learning network in a manner that is not specific to any particular platform. Instantiations of the base Layer class type and the subclass types may be independent of any particular target platform.

The systems and methods may extract the network parameters from the DL network's layers, and store them in one or more data structures, such as one or more files. The code generator 1404 may include a front-end 1412 that generates one or more in-memory intermediate representations (IRs) for the DL network 1410. One or more of the IRs may be in the form of a Data Flow Graph (DFG) and/or a Control Flow Graph (CFG) for the DL network. An IR may include nodes that correspond to the layers of the DL network. One or more cross-layer optimizations 1414 may be performed on one or more of the IRs.

In some embodiments, compile time conditionals may be associated with the class hierarchy, and the compile time conditionals may be used to control one or more characteristics, such as data characteristics, of the generated code. One compile time conditional may specify the data type of the generated code. Data type refers to the way in which numbers are represented in computer memory. A data type may determine the amount of storage allocated to a number, the method used to encode the number's value as a pattern of binary digits, and the operations available for manipulating the data type. Different data types may have different precision, dynamic range, performance, and memory usage. A modeling environment may support multiple different data types. Exemplary numeric data types include: integers, floating point, fixed point, and Boolean. Another compile time conditional may specify a type of data alignment of the generated code, such a row major or column major. Another compile time conditional may specify a type of algorithm for one or more layers of the deep learning network. For example, a compile time conditional may specify a type of convolution algorithm for one or more of the convolution layers of a deep learning network. Exemplary types of convolution algorithms include the Winograd Algorithm, the Cook-Toom Algorithm, Iterated Convolution, and Cyclic or Circular Convolution, among others.

The systems and methods may map the nodes of an IR that represent the layers of the DL network to respective subclass types of the selected class hierarchy. For example, the systems and methods may map a node of an IR for the DL network that represents a convolution layer to a Convolution subclass type, or a node that represents a pooling layer to a Pooling subclass type, etc. In some implementations, the systems and methods may transform an IR in the form of a Data Flow Graph (DFG) to an IR in the form of a Control Flow Graph (CFG) that may include objects classified as Statements, Variables, Functions, Data Types, etc. The systems and methods may utilize the subclass types of the class hierarchy, such as the Convolution subclass type, the Pooling subclass type, etc., to transform and/or construct the CFG form of IR for the DL network. The CFG for of IR for the DL network also may include an object of a Network class type.

The code generator may include one or more back-ends, such as a C/C++ back-end 1416a, a GPU back-end 1416b, and a Hardware Definition Language (HDL) back-end 1416c, which may utilize an IR, such as an IR in the form of a CFG, to produce the generated code for the DL network 1410. The generated code may include code, e.g., contained in a main file, that instantiates an object of the Network class type (Network object). The Network object may construct objects for the layers of the DL network from the Layer subclass types (Layer objects). The Network object may execute methods or functions on the Layer objects. For example, the Network object may direct the Layer objects to set-up or initialize, process input data, and perform cleanup operations. In some embodiments, the generated code may be HDL code 1418 that may be deployed on an embedded system, such as a Field Programmable Gate Array (FPGA) and/or a System on a Chip (SoC).

The systems and methods may store the generated code, which may be in source code form, in a container such as a project folder. The systems and methods may also generate a build file, which may also be included in the project folder. The one or more network parameter files also may be included in the folder.

A compiler may create an executable from the contents of the folder. The executable, which may be a library, an .exe file, a mex target, etc., may be deployed on a hardware platform.

In some embodiments, the architecture of the class hierarchy may be exposed so that new Layer subclass types may be defined and added to the class hierarchy and/or existing Layer subclass types may be changed or updated.

Figure 2:
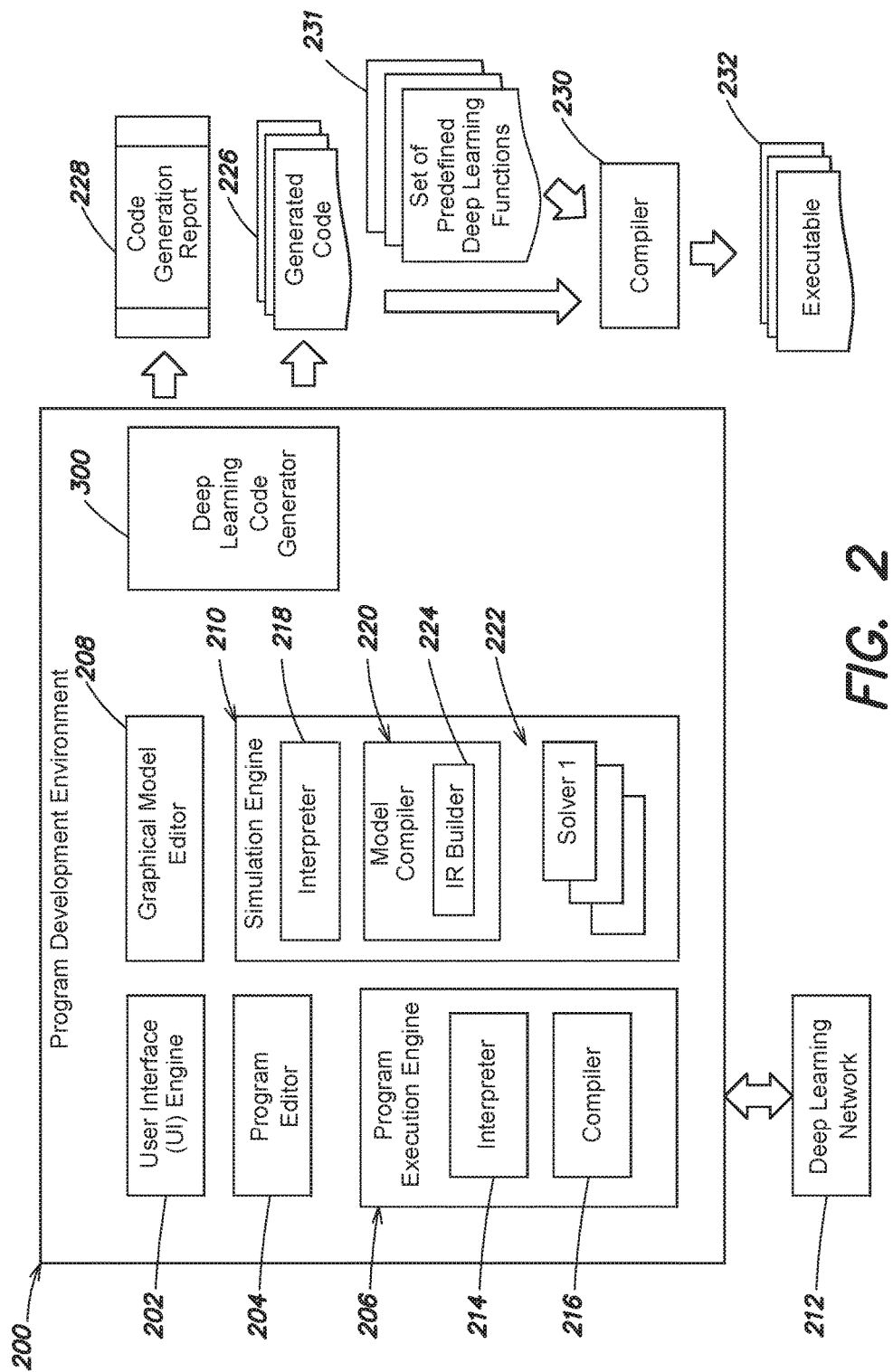
FIG. 2 is a schematic illustration of an example of a program development environment in accordance with an embodiment.

FIG. 2 is a schematic illustration of an example of a program development environment 200 in accordance with an embodiment. The program development environment 200 may include a User Interface (UI) engine 202, a program editor 204, a program execution engine 206, a graphical model editor 208, a simulation engine 210, and a deep learning code generator 300.

The UI engine 202 may create and present one or more User Interfaces (UIs), such as Graphical User Interfaces (GUIs) and/or Command Line Interfaces (CLIs), on a display of a workstation or other data processing device. The UIs may be operated by a user to initiate various program development-related tasks. For example, a user may open, write, edit, and save a source program, which tasks may be performed by the program editor 206 in response to user inputs. The UIs also may be operated to open, construct, edit, and save source programs in the form of graphical models, such as executable block diagrams, and the graphical model editor 208 may perform the selected operations in response to user inputs. The program execution engine 206 and/or the simulation engine 210 may be used to run and/or execution a source program, such as a trained deep learning network application program (DL network) 212.

The DL network 212 may be in source code format. In some embodiments, the DL network may be an object of the Series Network Class created in the Neural Network Toolbox, which supports Object Oriented Programming (OOP), from The MathWorks. A Series Network object includes the layers of a trained network. Other representations of a DL network include a Directed Acyclic Graph (DAG), a MATLAB file, etc. A DL network or portion thereof may be represented in a .prototxt file. The layers of the DL network may include a plurality of network parameters, such as weights and biases.

The program execution engine 206 may include an interpreter 214 and/or a compiler 216. In some embodiments, the compiler 216 may be a just-in-time (JIT) compiler that may be used to perform operations on or with the deep learning network 212, such as using the deep learning network 212 to classify input data.

As described herein, the deep learning code generator 300 may generate code, such as generated code 226, for the DL network 212 automatically. The generated code 226 may include links or calls to one or more libraries. The DL network 212 may be a trained deep learning network, and the code 226 generated by the deep learning code generator 300, when compiled and executed, may perform forward prediction based on the design of the trained DL network 212. The deep learning code generator 300 also may generate a code generation report 228. The generated code 226 may be provided to a compiler 230, such as a C compiler, Nvidia's nvcc compiler, etc., which may translate the generated code 226 and the library functions called by the generated code to produce executable code 232. The executable code 232, which may be in the form of assembly code, may be deployed on a deployed system, such as a target platform.

The simulation engine 210 may include an interpreter 218, a model compiler 220, and one or more solvers, designated at 222. The model compiler 220 may include one or more Intermediate Representation (IR) builders, such as IR builder 224. The simulation engine 206 may execute, e.g., compile and run or interpret a source program that is in the form of a graphical model using one or more of the solvers 222. Exemplary solvers include one or more fixed-step continuous solvers, which may utilize integration techniques based on Euler's Method or Heun's Method.

Suitable program development environments include the MATLAB® programming system, including the Neural Network Toolbox, and the Simulink® model-based design system both from The MathWorks, Inc. of Natick, Mass. In some embodiments, a DL network may be created and/or trained within a deep learning framework. Exemplary deep learning frameworks include the open source Caffe deep learning framework from University of California at Berkeley, the Caffe2 deep learning framework from Facebook, Inc. of Menlo Park, Calif., the Microsoft Cognitive Toolkit (CNTK) from Microsoft Corp. of Redmond, Wash., the TensorFlow machine learning library from Google Inc. of Mountain View, Calif., the Theano numerical computation library for Python from the University of Montreal, the open source Torch machine learning library, the Chainer open source framework for deep learning algorithms, the MatConvNet toolbox for the MATLAB programming system, the LightNet deep learning framework for MATLAB from Cornell University, and the open source Darknet neural network framework for C, and the Compute Unified Device Architecture (CUDA) from Nvidia Corp. of Santa Clara, Calif., among others. Deep learning frameworks, such as those described above, include interfaces for computer programming languages, such as C/C++, Python, Lua, Java, and Julia, among others. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the DL network 212 may be a textual program, a graphical model, or a combination textual/graphical program. Suitable text-based source programs include MATLAB programs, C programs, C++ programs, FORTRAN programs, Java programs, Mathematica programs, Python programs, Julia programs, Lua programs, ADA programs, Octave programs, and MathScript programs, and Octave programs, among others.

Figure 3:
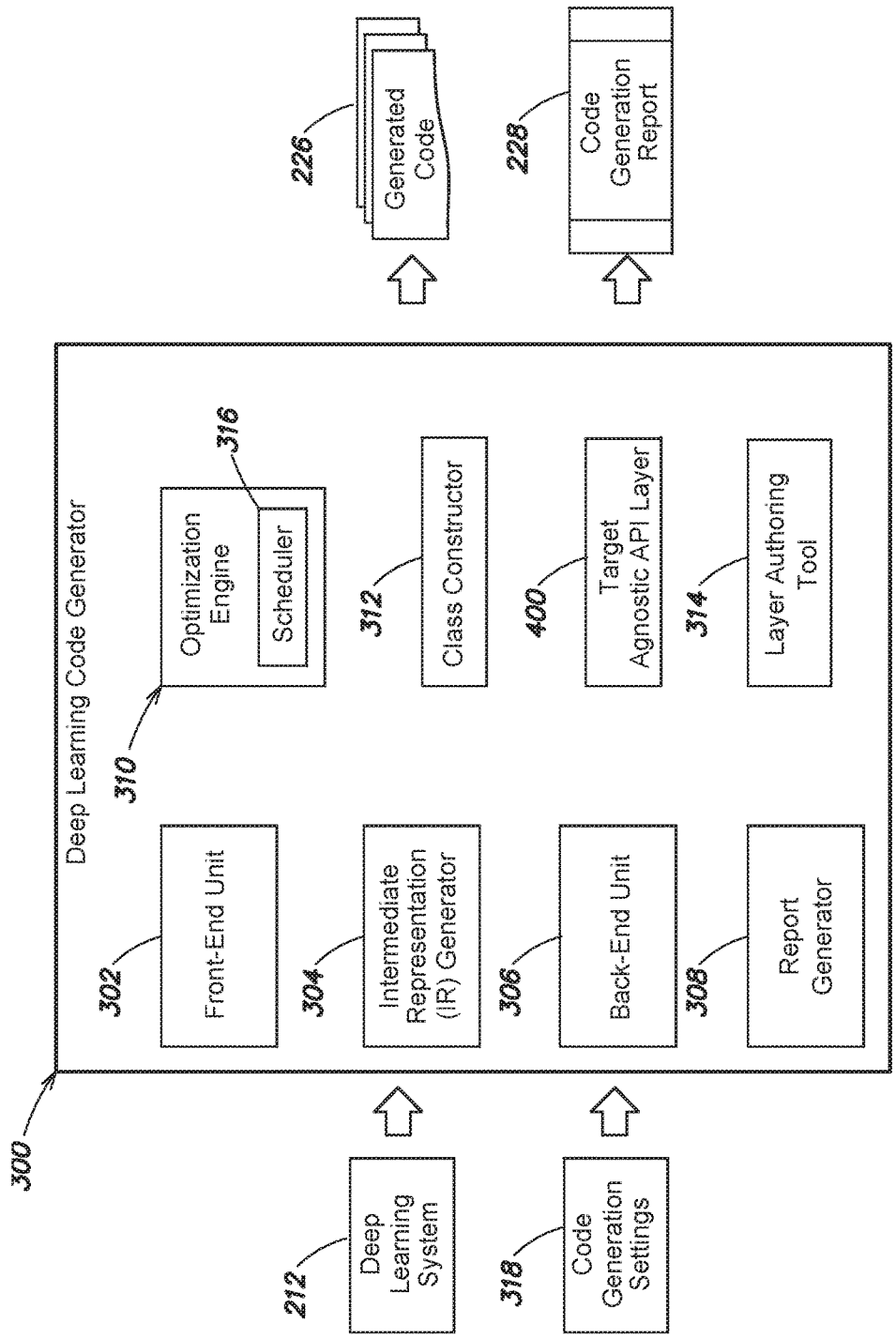
FIG. 3 is a schematic illustration of an example of a code generator in accordance with an embodiment.

FIG. 3 is a schematic illustration of an example of the deep learning code generator 300 in accordance with an embodiment. The deep learning code generator 300 may include a front-end unit 302, an intermediate representation (IR) generator 304, a back-end unit 306, a report generator 308, an optimization engine 310, a class constructor 312, a target agnostic Application Programming Interface (API) layer indicated at 400, which may be object oriented class hierarchies, and a layer authoring tool 314. The optimization engine 310 may include a scheduler 316.

The deep learning code generator 300 may access and/or receive the DL network 212. The deep learning code generator 300 may also receive one or more code generation settings, as indicated at 318. The deep learning code generator 300 may generate the generated code 226 automatically for the DL network 212, which may be compiled and deployed and run on a target platform. Exemplary target platforms include host computers having one or more single core and/or multicore CPUs and one or more Parallel Processing Units (PPUs), such as Graphics Processing Units (GPUs), and embedded systems including single and/or multicore CPUs, microprocessors, Digital Signal Processors (DSPs), and/or Field Programmable Gate Arrays (FPGAs). The report generator 308 may generate the code generation report 228.

The deep learning code generator 300 and/or one or more of its parts or components may comprise registers and combinational logic configured and arranged to produce sequential logic circuits. In some embodiments, the deep learning code generator 300 may be implemented through one or more software modules or libraries containing program instructions pertaining to the methods described herein, that may be stored in memory and/or on computer readable media, and may be executed by one or more processors. Other computer readable media may also be used to store and execute these program instructions. In alternative embodiments, various combinations of software and hardware, including firmware, may be utilized to implement the present disclosure.

FIGS. 2 and 3 are meant for illustrative purposes and the present disclosure may be used with other programming environments and code generators. For example, in some embodiments, the deep learning code generator 300 may be separate from the program development environment 200.

Figure 4:
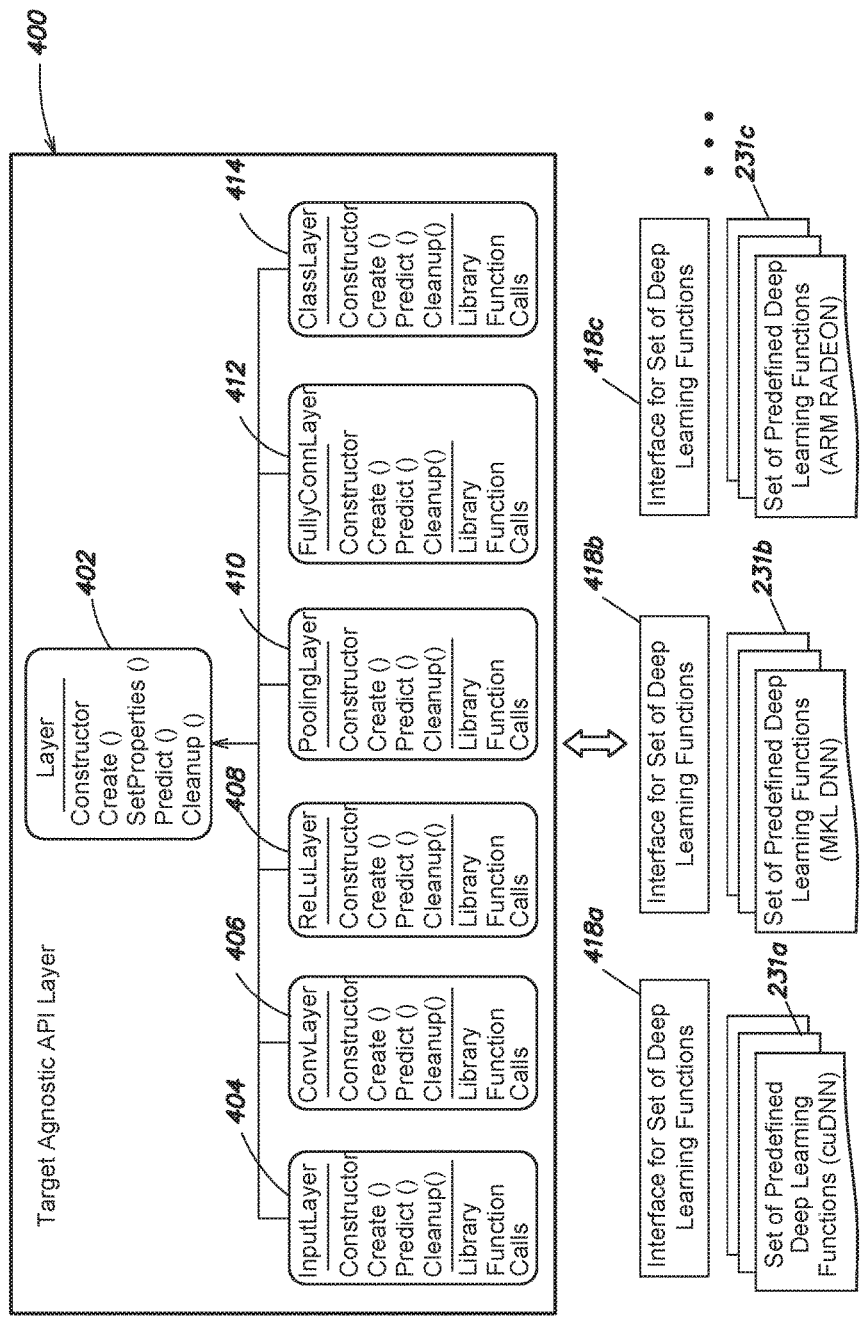
FIG. 4 is a schematic illustration of an example class hierarchy in accordance with an embodiment.

FIG. 4 is a schematic illustration of an example target agnostic API layer 400 in accordance with an embodiment. The target agnostic API layer 400 may include a base class type 402 called Layer and a plurality of subclass types. As described herein, the base and subclass types of the target agnostic API layer 400 correspond to the various layers that may be used in a DL network. Exemplary subclass types of the target agnostic API layer 400 may include an Input Layer (InputLayer) subclass type 404, a Convolution Layer (ConvLayer) subclass type 406, a Rectified Linear Unit Layer (ReLuLayer) subclass type 408, a Pooling Layer (PoolingLayer) subclass type 410, a Fully Connected Layer (FullyConnLayer) subclass type 412, and a Classification Layer (ClassLayer) subclass type 414. The Layer class type 402 may define a plurality of functions and/or methods. For example, the Layer class type 402 may define a Constructor method, a Create method, a SetProperties method, a Predict method, and a Cleanup method. In some embodiments, the Create, SetProperties, Predict, and Cleanup may be virtual methods whose definition in the base class may be purely virtual. The subclass types may inherit and thus include these functions or methods. One or more of the subclass types 404-414 may include additional methods defined for that subclass type in addition to the methods defined for the base Layer class type 402 through the object oriented programming (OOP) concept of inheritance.

The Layer class type 402 and the individual layer subclass types 404-414 implement one or more target-agnostic interface layers. The layer subclass types 404-414 may have multiple implementations 418*a*, 418*b*, and 418*c* to access different sets of predefined primitives or functions for performing deep learning operations, functionality, or tasks. One or more of these different sets of predefined deep learning functions, which are identified as 231*a*, 231*b*, and 231*c*, may be implemented as libraries. For example, one of the sets, e.g., 231*a*, of predefined deep learning functions may correspond to the CUDA Deep Neural Network (cuDNN) library from Nvidia. This library contains GPU-accelerated primitives implementing standard neural network routines such as forward and backward convolution, pooling, normalization, and activation, among others, used by deep learning networks. The primitives included in cuDNN are highly tuned for execution on GPUs. Set 231*b* may correspond to the MKL-DNN library, and set 231*c* may correspond to the ARM Compute library.

Each layer subclass type 404-414 may include calls through a respective one of the interfaces 418 to run selected ones of the predefined primitives or functions provided by the sets or libraries 231. For example, the ConvLayer subclass type 406 may include calls to run convolution primitives or functions provided by the cuDNN library 231*a*, the PoolingLayer subclass type 410 may include calls to run pooling primitives or functions provided by the cuDNN library 231*a*, and so on.

The base Layer class type 402 and the subclass types 404-414 of the target agnostic API layer 400 may be authored program elements. For example, they may be manually, e.g., hand, coded class types. The subclass types 404-414 may be manually coded to call particular primitives or functions to carry out the operations of the respective layer of a DL network implemented through the subclass types. The base Layer class type 402 and the subclass types 404-414 may be defined, e.g., authored by a user, to be independent of any particular target platform. For example, the subclass types 404-414 may represent abstractions of particular layers of a deep learning network, such as the convolution, ReLU, and pooling layers, among others, of a CNN. The actual functionality of these layers for a given implementation deep learning algorithm, such as the DL network 212, may be performed through calls by the subclass types 404-414 to the set 231 of predefined deep learning functions.

The interfaces 418 may interface the target agnostic API layer 400 to other sets, e.g., libraries, of predefined deep learning functions or primitives. For example, a respective interface 418 may provide the target agnostic API layer 400 with an interface to the Zeroth SDK from Qualcomm, the PDNN Python toolkit for deep learning, and the OpenVX platform of accelerated computer vision applications, from Khronos Group, the Reconfigurable Vision (ReVision) system from Xilinx, Inc. of San Jose, Calif., the ARM Compute Library of low-level software functions optimized for ARM's Neon and Mali processor platforms, and the CUDA Basic Linear Algebra Subprograms (cuBLAS) Library, among others. While the primitives and functions of cuDNN are optimized for GPU execution, the primitives and functions of the Intel® Math Kernel Library for Deep Neural Networks (MKL-DNN) are highly optimized for Intel processor architectures, e.g., Central Processing Units (CPUs). Libraries that provide layer-specific APIs defined for other platforms, such as Field Programmable Gate Array (FPGAs), may also be targeted.

The interfaces 418 may provide different implementations of a network layer, such as a convolution layer or a pooling layer, among others that are optimized for example in terms of execution speed and/or memory usage for a particular target platform. For example, for a target platform that includes a GPU, the implementation may include cuDNN library calls, handwritten CUDA code, and/or a BLAS implementation.

In some embodiments, the target agnostic API layer 400 may be stored in one or more packages, e.g., namespaces for organizing the class hierarchy and the class types defined therein.

Figure 5A:
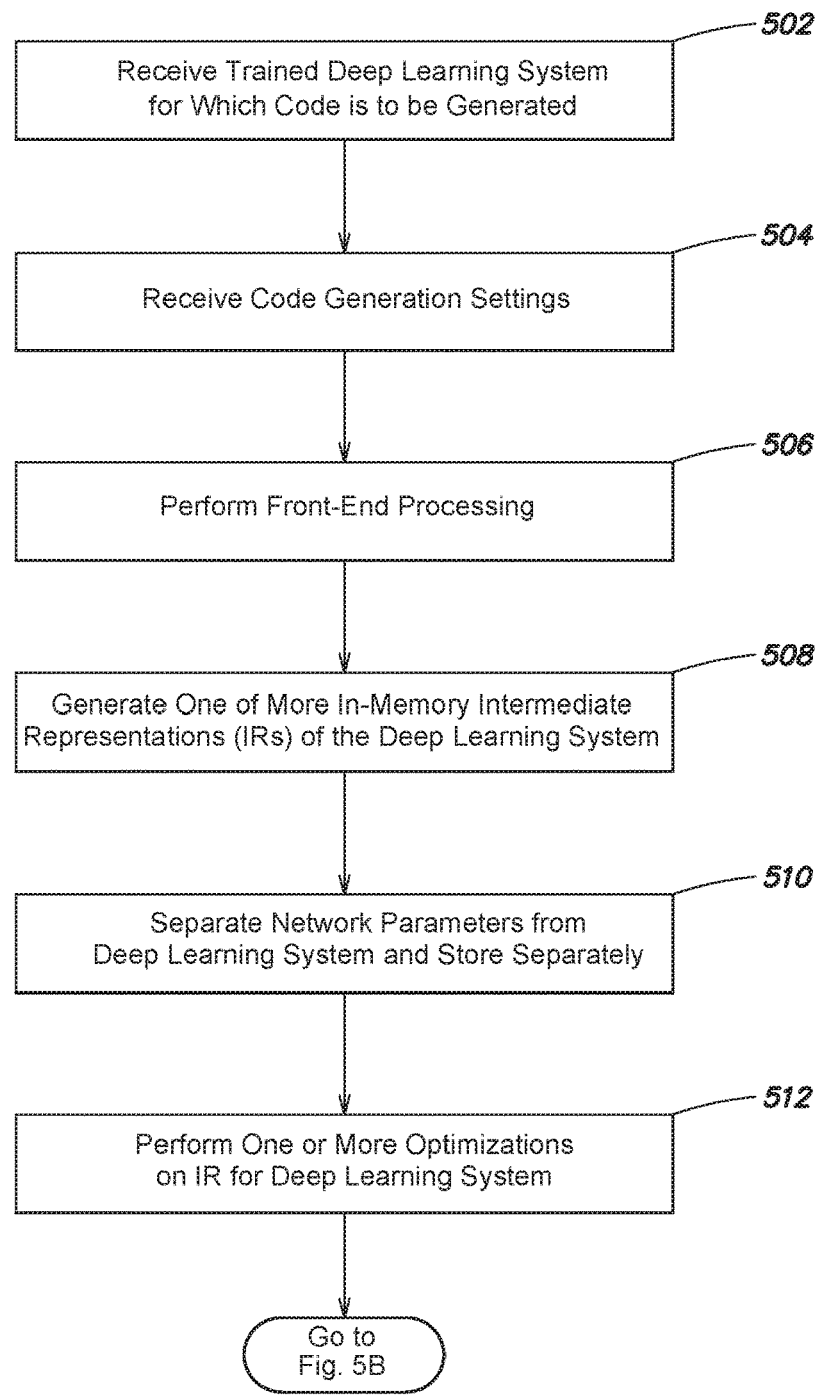
FIGS. 5A-5C are partial views of a flow diagram of an example method in accordance with an embodiment.
Figure 5B:
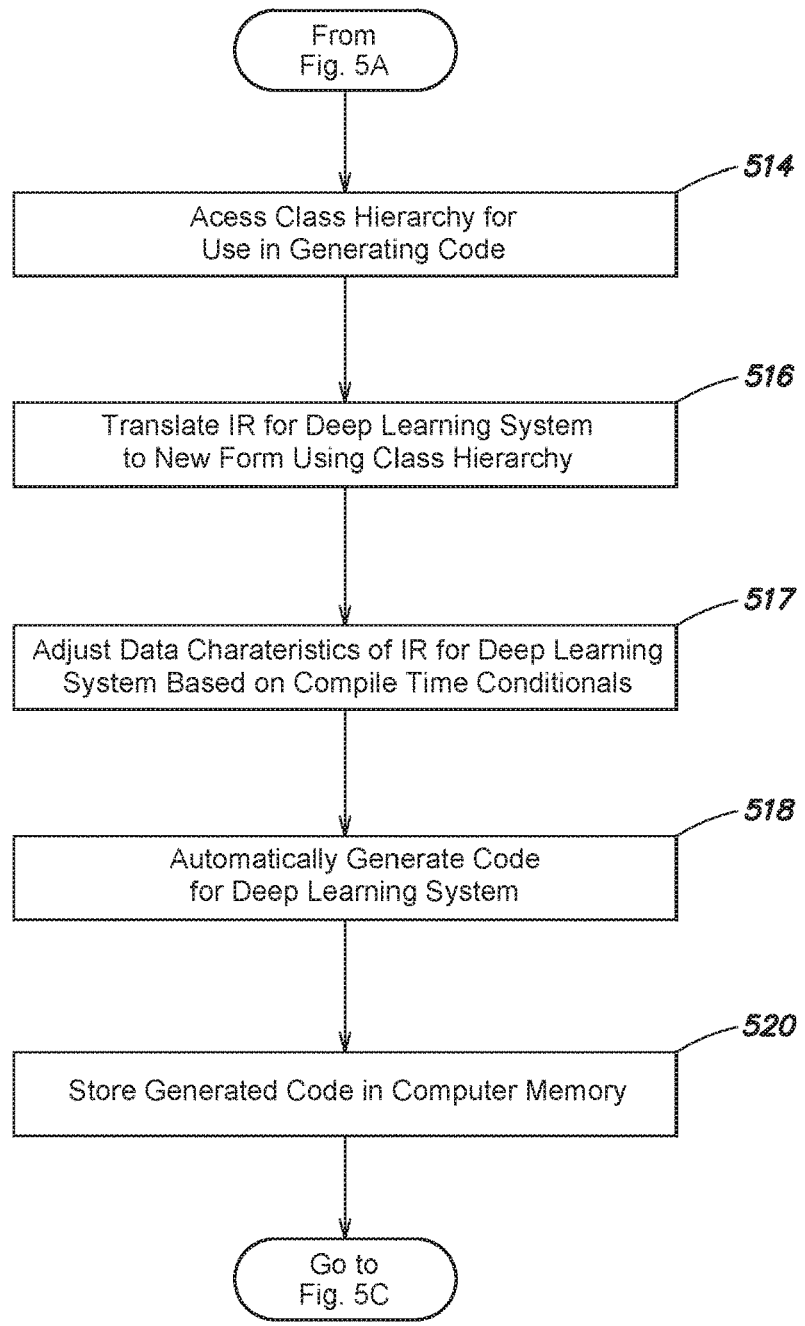
Figure 5C:
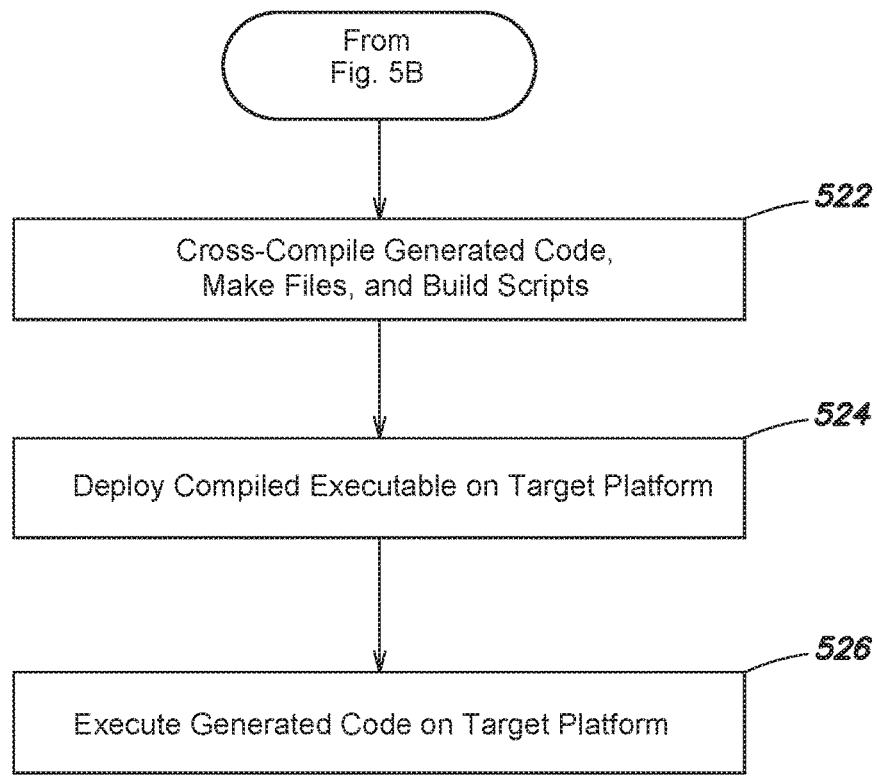

FIGS. 5A-5C are partial views of a flow diagram of an example method in accordance with an embodiment. The flow diagram of FIGS. 5A-5C is meant for illustrative purposes only. For example, in some embodiments, one or more steps may be omitted, additional steps may be added, the order of steps may be changed, and/or one or more sequences indicated by the arrows may be omitted. The deep learning code generator 300 may access or receive a DL network, such as the DL network 212, or a portion thereof for which code is to be automatically generated, as indicated at step 502. The DL network 212 or portion thereof may be accessed from memory, such as the main memory of a workstation or other data processing device. In some embodiments, the DL network may be a MATLAB SeriesNetwork object. The SeriesNetwork object may be created in the MATLAB environment or imported as a SeriesNetwork object from another environment. For example, a trained DL network may be imported from Caffe, Torch, TensorFlow, Darknet, Lightnet, Theano, Microsoft Cognitive Toolkit (CNTK), or another environment as a MATLAB SeriesNetwork object. For example, a pretrained convolutional neural network model from Caffe may be imported as a Series Network object using the MATLAB command 'importCaffeNetwork'. Other importers may be used to convert DL networks from other frameworks to the MATLAB framework, e.g., a SeriesNetwork object, a Directed Acyclic Graph (DAG), a MATLAB file, etc.

The deep learning code generator 300 also may receive one or more settings, such as the code generation settings 318, for guiding or controlling the code generation process for the DL network 212, as indicated at step 504. The options may indicate which predefined library is to be used in the generated code 226, such as Nvidia's cuDNN library, among others. Alternatively or additionally, the options may indicate the platform target, for example a CPU target platform, a GPU target platform, a TPU target platform, an FPGA target platform, etc. The options also may indicate the identity of a compiler tool chain, such as Nvidia's nvcc compiler, a C/C++ compiler, etc. Other options may indicate whether the generated code should be optimized for speed of execution or to minimize memory usage. Other options may indicate whether to run the DL network 212 on a single input at a time or with batches of inputs at a time. When passing in a batch of inputs at a time to the DL network, the operation on a batch may be vectorized or when calling a predefined deep learning function of a library, the entire batch may be passed to the function. It should be understood that other settings or options may also be specified and received by the deep learning code generator 300.

The front-end unit 302 may perform a number of preliminary tasks on the DL network 212, as indicated at step 506. For example, the front-end unit 302 may perform type checking and lexical analysis of the DL network 212, among other preliminary tasks. The IR generator 304 may translate the received DL network 212 (or portion thereof) into one or more intermediate representations (IRs), as indicated at step 508. One or more of the IRs constructed by the IR generator 304 may be in a form that is source and target language independent, such that operations and data contained within such IRs are not specific to the programming language in which the DL network 212 was written.

In some embodiments, the IR generator 304 may be included in the front-end unit 302. In other embodiments, the deep learning code generator 300 may utilize the IR builder 224 of the model compiler 220 to construct in-memory IRs of the DL network 212, rather than having its own IR generator 304.

The front-end unit 302 and/or the IR generator 304 may be configured to translate source programs conforming to a variety of different programming languages, such as C, C++, MATLAB, Python, Java, etc., to the one or more IRs. That is, the front-end unit 302 and/or the IR generator 304 may be capable of translating programs written in these various programming languages into the one or more IRs.

In some embodiments, one or more IRs may be graph-based, object-oriented structures. For example, one or more IRs may be in the form of a hierarchical Data Flow Graph (DFG) and/or a Parallel Intermediate Representation (PIR), which may include a plurality of IR objects, such as nodes, which may represent layers of the DL network 212, interconnected by edges, which may represent data flow. Other IRs may be in the form of a Code Generation Intermediate Representation (CGIR). The CGIR may include nodes, which may represent blocks of program statements, and edges, which may represent control flow. In some embodiments, one or more IRs and/or one or more IR nodes may be implemented in other forms, such as a syntax tree, Abstract Syntax Tree (AST), Direct Acyclic Graph (DAG), Control Flow Graph (CFG), Control Data Flow Graph (CDFG), program structure tree (PST), etc. A CDFG may capture the control flow as well as the data flow of a source program through data dependency and control dependency edges.

The IRs may be stored in memory, such as a main memory or a persistent memory of a data processing device.

In some implementations, the deep learning code generator 300 may start its processing on an initial IR created for the DL network 212. The deep learning code generator 300 may perform one or more operations on the initial IR, which may in some cases result in the creation of an intermediary IR. For example, high-level functions included in the DL network 212, may be lowered and represented by lower-level operations and ultimately by base level operations, such as mathematical operations. Further processing by the deep learning code generator 300 may be performed on the intermediary IR creating additional intermediary IRs. When processing by the deep learning code generator 300 is complete, a final IR may be produced. The final IR may be in a form from which the deep learning code generator 300 can directly output the generated code 226. In other implementations, a single IR may be created for the DL network 212, and this single IR may be processed by the deep learning code generator 300 until it is in a form from which the generated code 226 can be produced. Accordingly, the term IR as used herein is intended to broadly cover all such initial, intermediary, final, and single-form IRs.

Suitable tools for translating a source program, such as the DL network 212, into one or more IRs include the MATLAB Coder, the Simulink Coder, and the HDL Coder products from The MathWorks, Inc., and the tfcompile tool for ahead-of-time (AOT) compilation of TensorFlow programs. Nonetheless, other code generation systems and other compilers may be used.

As described, a deep learning algorithm or application, such as a CNN, may include adjustable network parameters, such as weights and biases, utilized by the CNN's layers. The deep learning code generator 300 may separate the network parameters from one or more IRs for the DL network 212, as indicted at step 510. The deep learning code generator 300 may store the network parameters in one or more files that in turn, may be stored within a project container, such as a folder of a file directory defined at a workstation. In some embodiments, the deep learning code generator 300 may store the separated network parameters in the form of one or more binary data files. In some implementations, the network parameters may be converted for example from a column-major to a row-major arrangement.

The optimization engine 310 may perform one or more optimizations on one or more of the IRs for the DL network 212, as indicated at step 512. As described herein, one optimization that may be performed by the optimization engine 310 is buffer allocation minimization. Another optimization that may be performed is mapping portions of the IR for the DL network 212, such as the portions that correspond to the layers of the DL network 212, to execution units of a target platform. For example, if the target platform onto which the generated code 226 is to be deployed and executed includes one or more Parallel Processing Units (PPUs), such as Graphics Processing Units (GPUs), the execution units may be Asynchronous CUDA Streams. If the target platform includes one or more multicore processors, such as a multicore CPU, the execution units may be threads. It should be understood that other execution units may be used, depending on the processing characteristics or capabilities of the target platform.

The class constructor 312 may access the target agnostic API layer 400 for use in generating the generated code 226, as indicated at step 514 (FIG. 5B). The IR generator 304 may transform one or more of the IRs for the DL network 212 to a new form that incorporates the selected target agnostic API layer 400, as indicated at step 516. In some embodiments, the new form of the IR may be a Code Generation IR (CGIR) format.

In addition, in some embodiments, the class constructor 312 may modify one or more data characteristics of variables represented in one or more the IRs for the DL network 212 based on one or more compile time conditionals, as indicated at step 517. The compile time conditionals may be used to set properties of the class types of the selected target agnostic API layer 400, thereby controlling the one or more data characteristics. One compile time conditional may control the data type of the class types and thus of the generated code 226. For example, depending on the settings of this compile time conditional, the generated code 226 may support a double precision floating point data type, a single precision floating point data type, a half-precision floating point data type, a fixed point data type, etc. Another compile time conditional may control the alignment of the input data processed by the generated code 226 for the DL network 212. For example, this compile time conditional may switch between row-major or column major data alignment. Data alignment can be especially useful for deep learning algorithms that process image data or other two-dimensional (2D) or three-dimensional (3D) data.

The back-end unit 306 may utilize the IR in CGIR form to generate the generated code, as indicated at step 518. In some embodiments, the generated code 226 may be in source code format, and may include a main file, one or more make files, and one or more build scripts. The deep learning code generator 300 may store the generated code 226 and other files in computer memory, for example in a project container together with the file containing the removed network attributes, as indicated at step 520.

In some embodiments, the deep learning code generator 300 may include or have access to multiple back-end units. For example, one back-end unit may be configured to produce C/C++ generated code from one or more IRs for the DL network 212 utilizing the MKL-DNN library or the ARM Compute Library, among others. Another back-end unit may be configured to produce code conforming to a CPU/GPU heterogeneous programming model, such as Nvidia's Compute Unified Device Architecture (CUDA), Open Accelerators (openACC), Open Computing Language (OpenCL), which is an open standard maintained by Khronos Group, Inc. of Beaverton, Oreg., DirectCompute from Microsoft Corp. of Redmond, Wash., among others. Another back-end unit may be configured to generated Hardware Description Language (HDL) code, such as VHDL or Verilog code.

In some embodiments, the deep learning code generator 300 may generate code to implement a deep learning application that includes more than running a trained DL network. For example, the generated code may additionally implement one or more pre-processing stages, such as reading input from hardware device, color channel conversion for image inputs, data augmentation such as de-noising, contrast enhancement, etc. The generated code also may implement post-processing techniques from the network output, such as mapping output to labels, non-max suppression, filtering, perspective transform of an output from one domain to another, etc. The deep learning code generator 300 may generate hardware optimized implementation for an entire deep learning application, and not just the network prediction part. Furthermore, the deep learning code generator 300 may generate code for an entire deep learning application that is optimized for a target platform. In some embodiments an application program may include a deep learning network as a part of the application program. The deep learning code generator 300 also may generate optimized code for one or more parts of an application other than a deep learning network part. For example, one or more of the optimizations described herein also may be applied to parts of the application program other than the deep learning network.

In some embodiments, a compiler, such as the compiler 230, may compile the generated code 226 to produce the executable 232, as indicated at step 522 (FIG. 5C). The generated code 226 may be cross-compiled with the selected set of predefined deep learning functions to produce the executable 232. In some embodiments, the generated code 226 may be compiled and linked to a set of predefined deep learning functions in the form of a dynamic library. The executable 232 may be deployed on a target platform, as indicated at step 524. The compiled executable may be run, e.g., executed, on the target platform, as indicated at step 526. As noted, one or more steps of the flow diagram of FIGS. 5A-5C may be performed separately and/or omitted, for example steps 522-526 may be performed separately and/or omitted in some embodiments.

AlexNet Example

AlexNet is a publicly available DL network in the form of a CNN for performing image classification. The deep learning code generator 300 may generate code automatically for the AlexNet image classifier.

For example, the MATLAB program development environment provides a series network class called SeriesNetwork that can be used to construct Object Oriented Programming (OOP) objects that implement deep learning algorithms. A SeriesNetwork object named 'net' may be constructed for a pretrained AlexNet image classifier using the MATLAB command:

net=alexnet

The 'net' SeriesNetwork object may include an array of objects that implement the layers of the pretrained AlexNet. At least some of these objects may be constructed from the Layer class provided by the MATLAB program development environment. The Layer class is described in the *Neural Network Toolbox User's Guide* (March 2017) from MathWorks, which is hereby incorporated by reference in its entirety.

The 'net' SeriesNetwork object constructed for the pretrained AlexNet image classifier may include twenty five (25) layers as shown in Table 1 below.

TABLE 1

| Layer Number | Layer Name | Layer Type | Layer Description |
|---|---|---|---|
| 1 | 'data' | Image Input | 227 × 227 × 3 images with 'zerocenter' normalization |
| 2 | 'conv1' | Convolution | 96 11 × 11 × 3 convolutions with stride [4 4] and padding [0 0] |
| 3 | 'relu1' | ReLU | ReLU |
| 4 | 'norm1' | Cross Channel Normalization | cross channel normalization with 5 channels per element |
| 5 | 'pool1' | Max Pooling | 3 × 3 max pooling with stride [2 2] and padding [0 0] |
| 6 | 'conv2' | Convolution | 256 5 × 5 × 48 convolutions with stride [1 1] and padding [2 2] |
| 7 | 'relu2' | ReLU | ReLU |
| 8 | 'norm2' | Cross Channel Normalization | cross channel normalization with 5 channels per element |
| 9 | 'pool2' | Max Pooling | 3 × 3 max pooling with stride [2 2] and padding [0 0] |
| 10 | 'conv3' | Convolution | 384 3 × 3 × 256 convolutions with stride [1 1] and padding [1 1] |
| 11 | 'relu3' | ReLU | ReLU |
| 12 | 'conv4' | Convolution | 384 3 × 3 × 192 convolutions with stride [1 1] and padding [1 1] |
| 13 | 'relu4' | ReLU | ReLU |
| 14 | 'conv5' | Convolution | 256 3 × 3 × 192 convolutions with stride [1 1] and padding [1 1] |
| 15 | 'relu5' | ReLU | ReLU |
| 16 | 'pool5' | Max Pooling | 3 × 3 max pooling with stride [2 2] and padding [0 0] |
| 17 | 'fc6' | Fully Connected | 4096 fully connected layer |
| 18 | 'relu6' | ReLU | ReLU |
| 19 | 'drop6' | Dropout | 50% dropout |
| 20 | 'fc7' | Fully Connected | 4096 fully connected layer |
| 21 | 'relu7' | ReLU | ReLU |
| 22 | 'drop7' | Dropout | 50% dropout |
| 23 | 'fc8' | Fully Connected | 1000 fully connected layer |
| 24 | 'prob' | Softmax | softmax |
| 25 | 'output' | Classification Output | crossentropyex with 'tench', 'goldfish', and 998 other classes |

Figure 6:
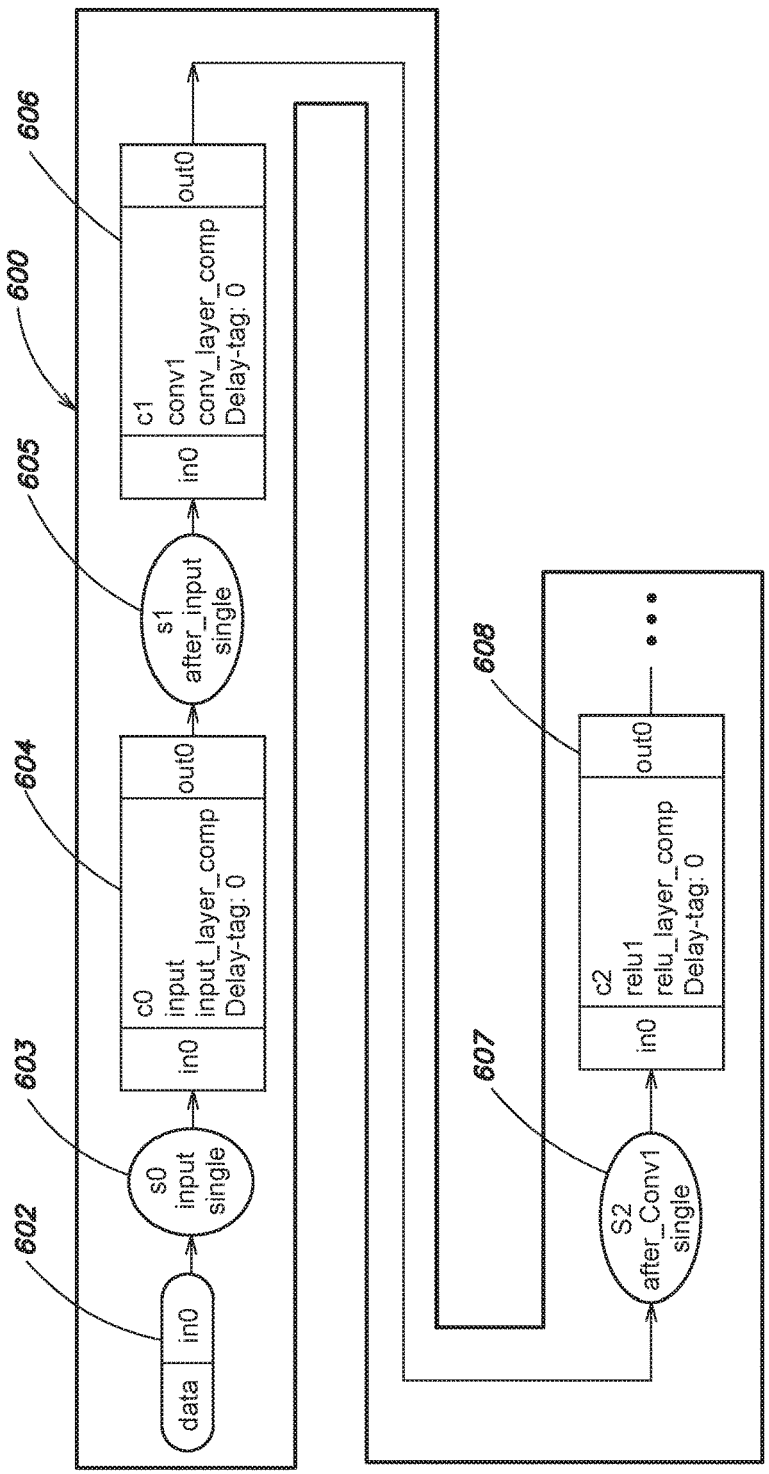
FIG. 6 is a schematic illustration of an example in-memory Intermediate Representation (IR) of a deep learning network in accordance with an embodiment.

The IR generator 304 may create one or more IRs for the 'net' SeriesNetwork object. FIG. 6 is a schematic illustration of an example IR 600 in the form of a PIR for the 'net' SeriesNetwork object for the pretrained AlexNet model in accordance with an embodiment. The PIR 600 may include a series of nodes, such as nodes 602-608. At least some of the nodes of the PIR 600 may correspond to respective layers of the 'net' SeriesNetwork object. For example, node 604 of the PIR 600 may correspond to layer 1 of the 'net' SeriesNetwork object, which is the Image Input layer named 'data'. Node 606 may correspond to layer 2 of the 'net' SeriesNetwork object, which is the Convolution layer named 'conv1'. Node 608 may correspond to layer 3 of the 'net' SeriesNetwork object, which is the ReLU layer named 'relu1'. It should be understood that FIG. 6 is a partial view of the PIR, and that the PIR may include additional nodes, e.g., for the other layers of the 'net' SeriesNetwork object.

Optimizations

In some embodiments, the optimization engine 310 may apply one or more optimizations to an IR for the deep learning source program 212, such as buffer allocation and parallel execution scheduling. The IR may be in the form of a PIR.

Buffer Allocation

During execution of a deep learning algorithm, memory may be allocated for the layers of the algorithm. For example, memory may be allocated for inputs processed by a given layer and for outputs computed by the given layer. The optimization engine 310 may modify one or more IRs for the DL network 212 in order to share memory between layers (e.g., non-concurrent layers) of the deep learning algorithm.

Figure 7:
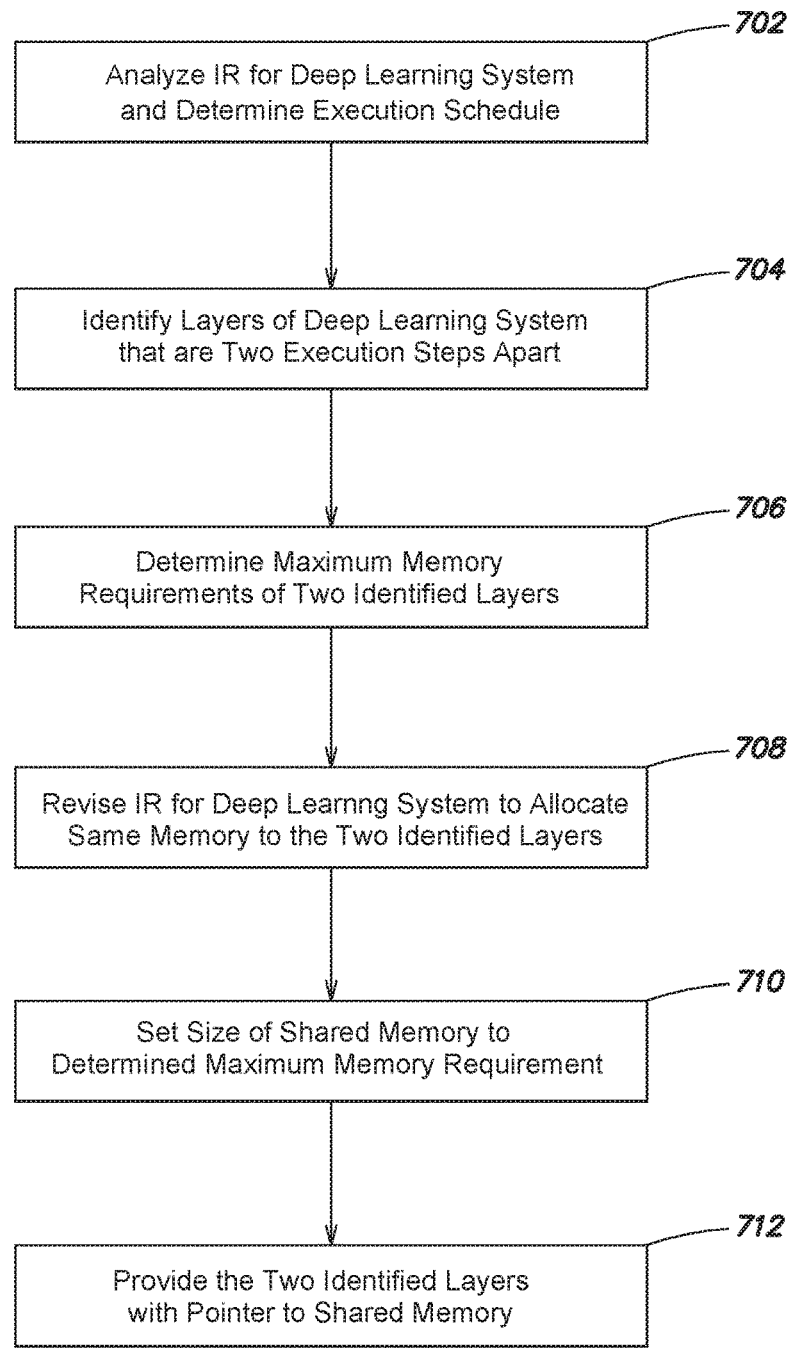
FIG. 7 is a flow diagram of an example method in accordance with an embodiment.

FIG. 7 is a flow diagram of an example method for performing a buffer allocation optimization in accordance with an embodiment. The scheduler 316 may analyze the PIR 600 to determine an execution schedule for the layers of the DL network 212, as indicated at step 702. A scheduling order may be created that specifies an order of execution of all or at least some of the layers of the DL network 212, and the scheduling order may be incorporated in the code generated for the DL network 212. The DL network 212 may be executed over a plurality of execution time steps for example beginning at a start time and ending at a stop time.

The scheduler 316 may generate one or more execution lists for the layers of the DL network 212. The scheduler 316 may utilize one or more algorithms for generating the execution lists. Exemplary scheduling algorithms include As Soon As Possible (ASAP) scheduling, As Late As Possible (ALAP) scheduling, force-directed scheduling, and list scheduling.

Based on the execution schedule, the optimization engine 310 may determine which layers of the deep learning network 212 are two execution steps apart, as indicated at step 704. For example, a convolution layer may be scheduled for execution at execution step 1 and a pooling layer may be scheduled for execution at execution step 3. For the two layers of the DL network 212 found to be two execution steps apart, such as the convolution and the pooling layers, the optimization engine 310 may determine the maximum of the memory requirements of the two layers identified as being two execution steps apart, as indicated at step 706. The optimization engine 310 may then modify the PIR 600 so as to allocate the same memory to the two layers, as indicated at step 708. The optimization engine 310 may set the size of the shared memory to the maximum memory requirement of the two layers, as indicated at step 710. In some embodiments, the optimization engine may provide the two layers with a pointer to the shared memory that is allocated to them, as indicated at step 712.

Once the memory requirements are identified, the create methods to both layers will take as input the same pointer to the shared memory block. Thus, both layers will write their outputs to the same memory block pointed to by the shared pointer.

The optimization engine 310 may apply one or more other memory or buffer optimizations. For example, the optimization engine 310 may analyze one or more of the IRs for the DL network 212 to determine whether two signals have the same data size properties. If so, the optimization engine 310 may re-use the same memory buffer for the two signals.

Parallel Execution Scheduling

Through operations on the PR 600, the optimization engine 310 may assign portions of generated code corresponding to different layers of the DL network 212 to execution units of the target platform that can operate concurrently to improve execution speed of the generated code 226 for the DL network 212.

Figure 8:
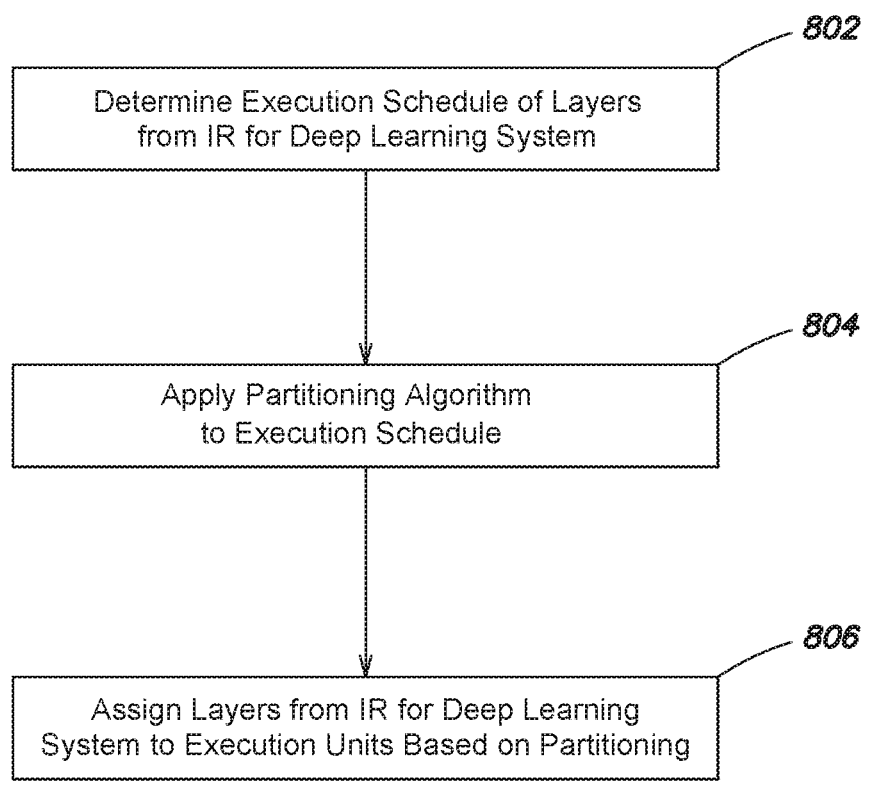
FIG. 8 is a flow diagram of an example method in accordance with an embodiment.

FIG. 8 is a flow diagram of an example method for performing parallel execution scheduling in accordance with an embodiment. The scheduler 316 may analyze the PIR 600 to determine an execution schedule for the DL network 212, as indicated at step 802. The optimization engine 310 may create a dependency graph, which may be a directed graph having nodes and edges. Nodes of the dependency graph may represent execution elements, such as a CUDA kernel, for executing the functionality of a layer of the DL network 212. Edges of the dependency graph may represent a data dependency between two execution elements. The optimization engine 310 may apply a partitioning algorithm, such as a clique partitioning algorithm, to the dependency graph to reduce or minimize the number of edges between cliques, as indicated at step 804. The partitioning algorithm may produce a dense connection structure, such as a clique. Each dense connection structure, e.g., clique, may be mapped to an execution unit of the target platform that will execute the generated code 226. For example, if the target platform includes one or more GPUs, then the execution units may be CUDA asynchronous streams. If the target platform includes a multicore CPU, then the execution units may be threads executed by the different cores of the multicore CPU. The optimization engine 310 may modify the PIR 600 to assign nodes of the PIR 600, which may represent layers of the DL network 212, to the execution unit that is mapped to the clique to which the clique partitioning algorithm assigned the node of the PIR 600, as indicated at step 806.

In some embodiments, the partitioning algorithm may use heuristics, such as an extension of the Kerningham-Lin partitioning algorithm that extends the partitions to multiple sets.

As described, at least some of the nodes of the PIR 600 correspond to layers of the DL network 212. The class constructor 312 may translate the PIR 600 into a new IR form by replacing the nodes of the PIR 600 that represent layers of the network with the matching class types from the particular target agnostic API layer 400 selected for creating the generated code 226 for the DL network 212. For example, node 604 of the PIR 600, which represents the system's input layer, may be translated to an InputLayer class type 404. Node 606 of the PIR 600, which represents a convolution layer, may be translated to a ConvLayer class type 406. Node 608 of the PIR 600, which represents a relu layer, may be translated to a ReLuLayer class type 408. This process may be repeated for the other PIR nodes representing the network's layers.

In some embodiments, the class constructor 312 may not include class types for network layers that are not needed to run a deployed version of the DL network 212. For example, as illustrated at Table 1, the 'net' NetworkSeries object includes two dropout layers at layers 19 and 22. Dropout layers are layers included to support training a CNN. Dropout layers are not used to classify new input data. In the process of translating the PIR to a new form, the class constructor 312 may not include class types for the nodes of the PIR 600 that represent the two dropout layers. Other layers that may be eliminated and/or not included in the PIR 600 for the DL network 212 include pass-through layers. By eliminating one or more layers, the class constructor 312 reduces memory requirements, for example it may reduce the memory required to load the DL network on a deployed system for execution.

In some embodiments, the new form into which the PIR is translated by the IR generator 304 and/or the class constructor 312 is a Code Generation Intermediate Representation (CGIR).

Figure 9:
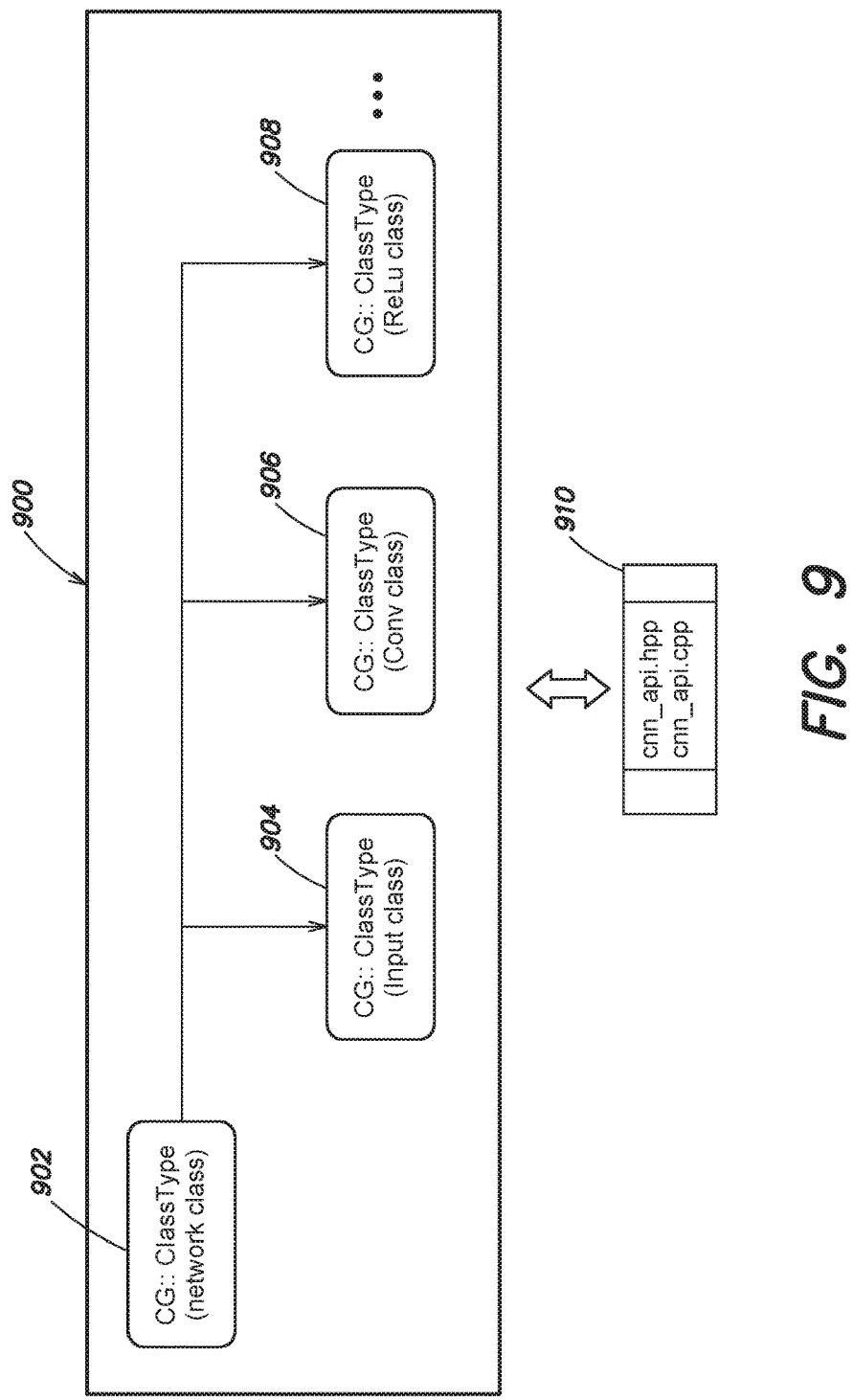
FIG. 9 is a schematic illustration of another example of an in-memory IR of a deep learning network in accordance with an embodiment.

FIG. 9 is a schematic illustration of an example IR 900 in the form of a Code Generation Intermediate Representation (CGIR). The IR 900 may be constructed for the 'net' SeriesNetwork object for the pretrained AlexNet image classifier. The CGIR 900 may include a Network Class type 902. In some embodiments, the CGIR 900 includes a single Network Class type 902. The CGIR 900 also may include class types for other layers of the DL network 212. For example, the CGIR 900 may include an Input Class type 904, a Convolution Class type 906, and a ReLu Class type 908, among others. The layer class types 904, 906, and 908 provide an API to functions of the predefined library, such as Nvidia's cuDNN indicated at 910.

It should be understood that FIG. 9 is a partial view of the CGIR, and that the CGIR may include additional class types, e.g., for the other layers of the 'net' SeriesNetwork object.

The back-end unit 306 may utilize the CGIR 900 to generate the generated code 226 for the DL network 212.

Figure 10:
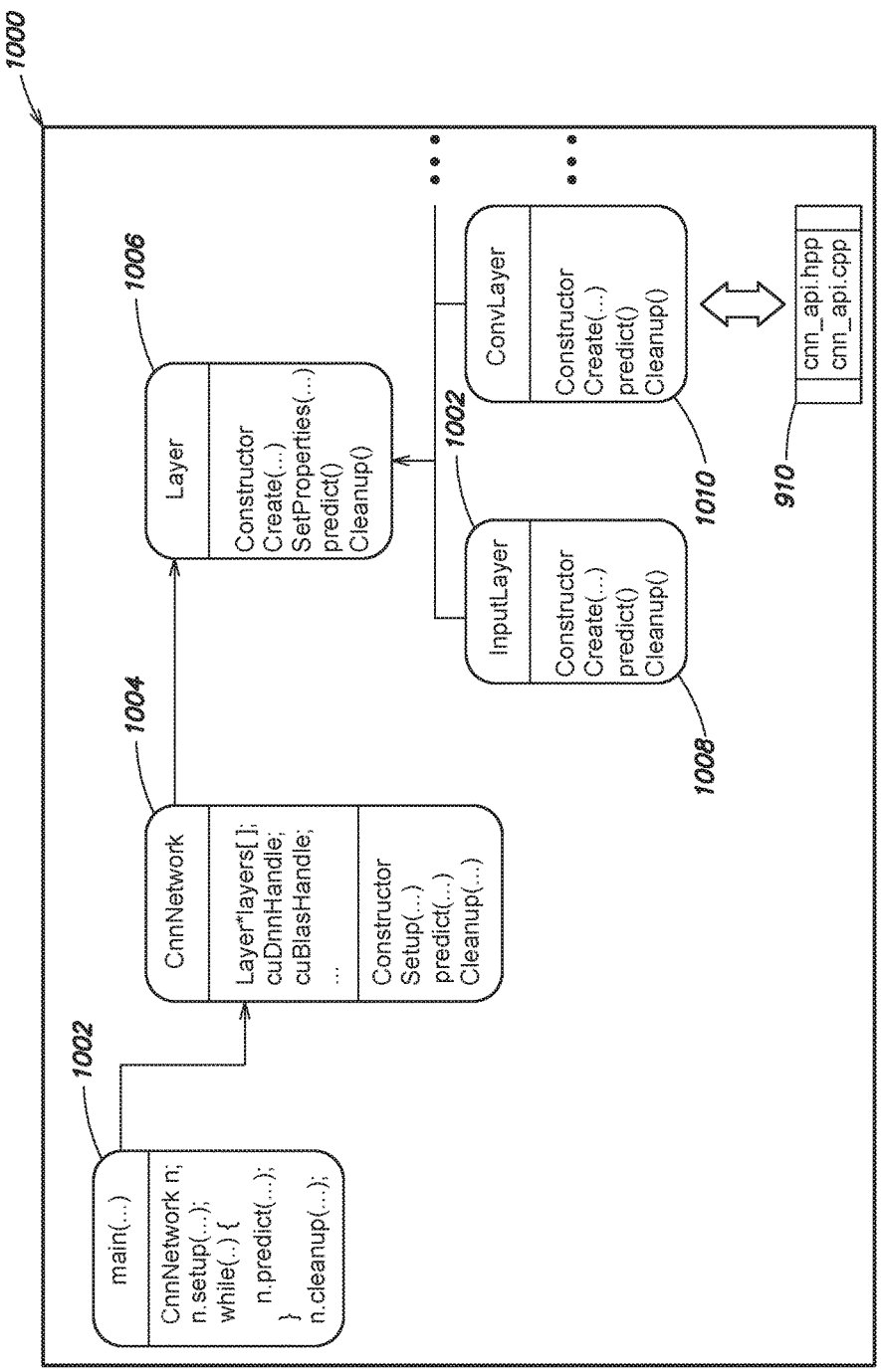
FIG. 10 is a schematic illustration of an example of a code structure for generated code in accordance with an embodiment.

FIG. 10 is a schematic illustration of an example of a code structure 1000 for generated code, such as the generated code 226, in accordance with an embodiment. The code structure 1000 may include a main file 1002, a Network class 1004, a Layer class 1006, and a series of individual layer classes, such as an InputLayer class 1008 and a Convolution Layer class 1010, among others. The individual layer classes 1008 and 1010 provide an API for calls to the predefined library, such as Nvidia's cuDNN library. In some embodiments, the predefined library 910 may be included in the generated code 1000.

The main file 1002 may include a function 'CnnNetwork' to instantiate a network object, a setup function 'n.setup( )', which calls setup on the individual layer objects, a predict function 'n.predice', which calls predict on the individual layer objects, and a cleanup function 'n.cleanup', which calls cleanup on the individual layer objects. As shown, the predict function may be included in a while-loop. The main file 1002 also may include read and write functions to read/write data to pre-allocated input and output memory buffers. The main file 1002 may read inputs from image data and write outputs to a display using the Open Source Computer Vision (OpenCV) library of programming functions.

In some embodiments, the setup function of the Network class 1004 may call the create functions of the Layer class 1006 and of the individual layer objects 1008, 1010 causing memory to be allocated, and network parameters, e.g., weights and biases, to be loaded for example from the file storing the network parameters. The predict function may call predict on each of the layers, which may in turn call the set of predefined deep learning functions 910, e.g., cuDNN, MKL-DNN, or ARM Compute Library, among others, to classify the input data. The cleanup function may call cleanup on each of the layer objects to free allocated memory and system resources.

It should be understood that FIG. 10 is a partial view of the generated code 1000, and that the generated code 1000 may include additional objects, e.g., for the other layers of the 'net' SeriesNetwork object.

Attached hereto as Appendices A to E are examples of generated code for a SeriesNetwork object for the pretrained AlexNet.

Appendix A is a C++ main file (main.cpp) that contains code for constructing and calling a Network object.

Appendix B is a CUDA file (cnn_exec.cu) and Appendix C is a C++ header file that are created based on the target agnostic API layer 400. These files contain code for defining the Layer objects for AlexNet that make calls through an API to the cuDNN library.

Appendix D is a C++ file (cnn_exec.cpp) and Appendix E is a C++ header file (cnn_exec.hpp) that are also created based on the target agnostic API layer 400. These files contain code for defining the Network object that constructs and calls the Layer objects.

The generated code 226 may also include or have access to the binary data files that contain the network parameters, e.g., weights and biases, that were separated from AlexNet.

The code included in Appendices B and C and, if requested by the user, in Appendix A may be auto-generated by the deep learning code generator 300.

The generated code 226 may be compiled to create a static library, e.g., cnnbuild.a, which may be dynamically linked to the selected set of predefined deep learning functions.

Modifying the Class Hierarchies

In some embodiments, a user, such as a programmer or developer, may edit the target agnostic API layer 400. For example, the user may create, e.g., author, a new layer class, and add this new layer class to the target agnostic API layer 400. As described, the target agnostic API layer 400 may be manually created, e.g., authored, by a programmer or developer.

Figure 11:
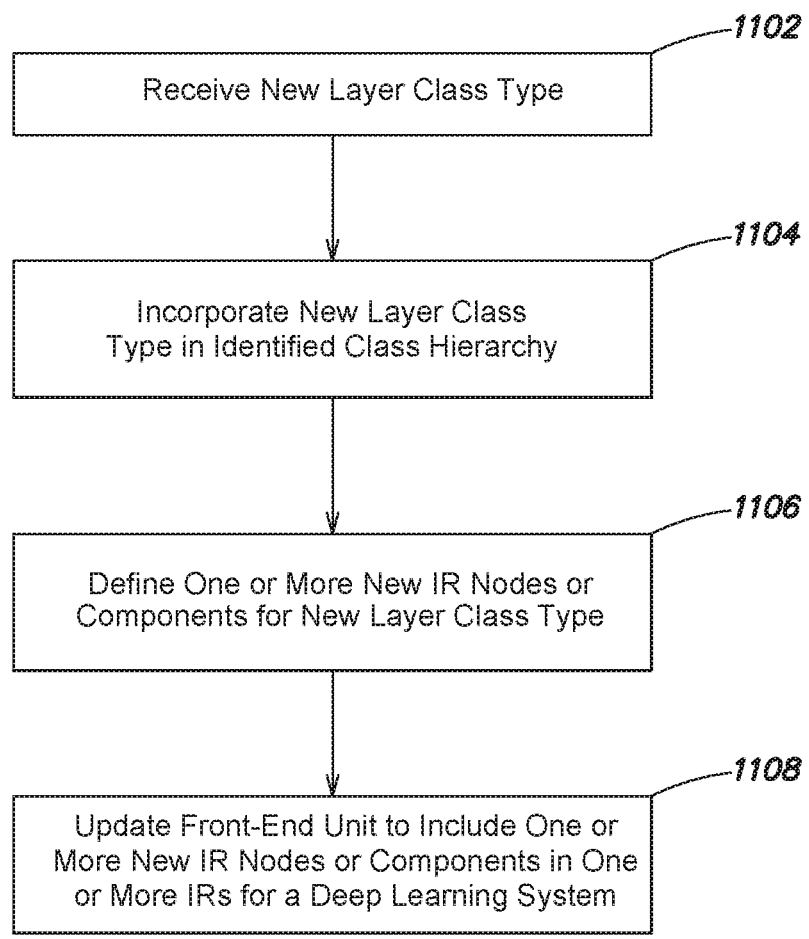
FIG. 11 is a flow diagram of an example method in accordance with an embodiment.

FIG. 11 is a flow diagram of an example method for including a new layer class in a class hierarchy in accordance with an embodiment. The deep learning code generator 300 may receive or access a new layer class type, as indicated at step 1102. For example, a user may author a new layer class, store the new layer type class in memory, and the layer authoring tool 314 of the deep learning code generator 300 may access the new layer class type from memory. The user may create the new layer class as a subclass of the Layer class type 402, which defines the Constructor, a SetProperties, Predict, and Cleanup methods or functions. Accordingly, the new layer class may inherit and thus include these functions or methods. The new layer class created by the user also may call the predefined deep learning functions of a given set or library 231.

The layer authoring tool 314 may incorporate the new layer class in the target agnostic API layer 400, as indicated at step 1104. For example, the layer authoring tool 314 may update the target agnostic API layer 400, as stored in the package, to include the new layer class. The layer authoring tool 314 also may define one or more new IR nodes or components for the new layer class type, as indicated at step 1106. In some embodiments, one of the new IR nodes or components may be in the form of a PIR node. Another new IR node or component may be in the form of a CGIR node. The layer authoring tool 314 may update the front-end unit 302 and/or the IR generator 304 to create an IR that includes the newly defined PIR node and/or CGIR node, as indicated at step 1108.

During code generation for a deep learning algorithm that includes a layer corresponding to the new layer class type, the deep learning code generator 300 may utilize the updated target agnostic API layer 400 to construct one or more IRs, such as a PIR and/or a CGIR, that include the new IR nodes or components.

Exemplary Data Processing Device

Figure 12:
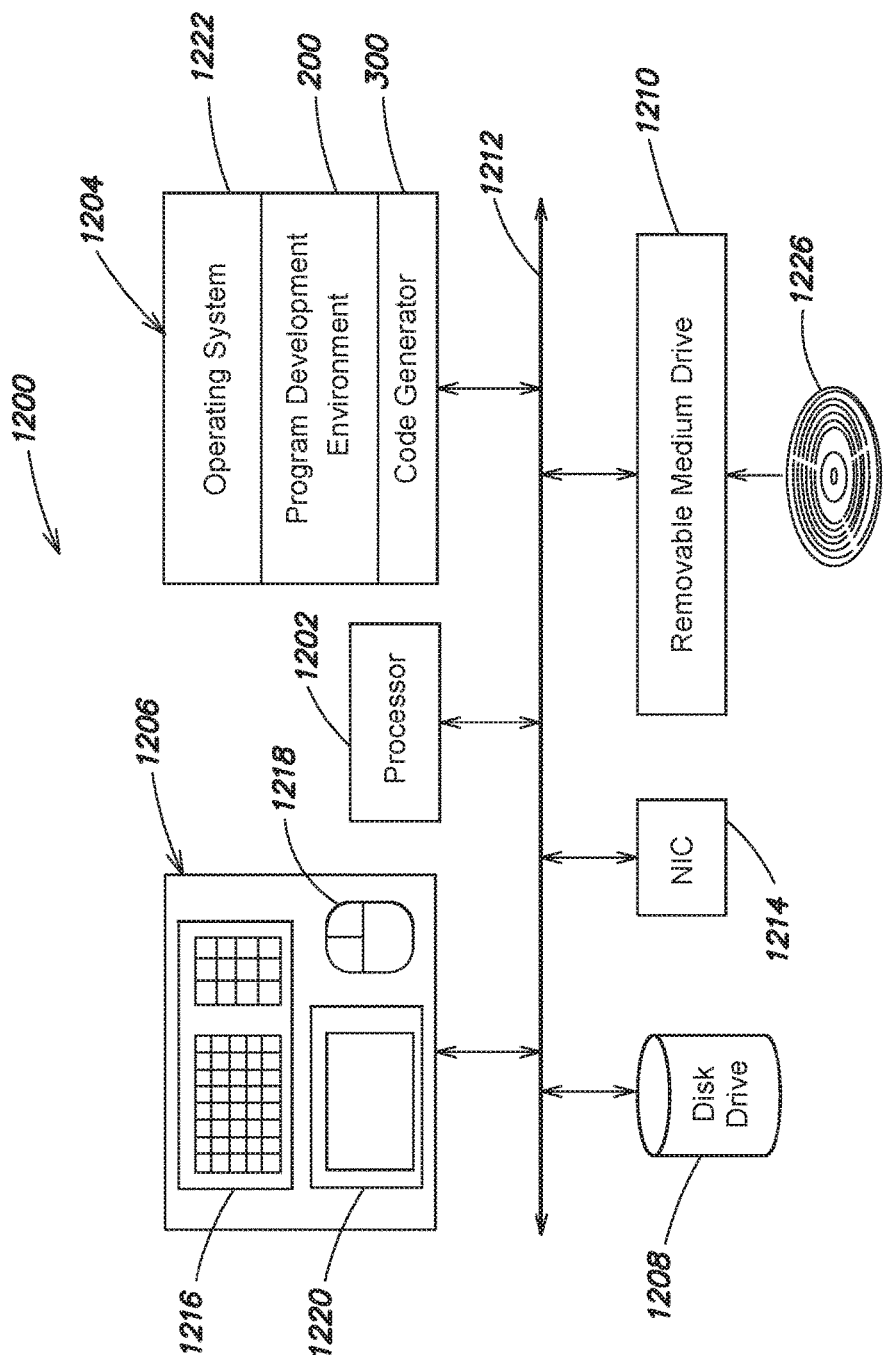
FIG. 12 is a schematic illustration of a computer or data processing system in accordance with an embodiment.

FIG. 12 is a schematic illustration of a computer or data processing system 1200 for implementing an embodiment of the disclosure. The computer system 1200 may include one or more processing elements, such as a processor 1202, a main memory 1204, user input/output (I/O) 1206, a persistent data storage unit, such as a disk drive 1208, and a removable medium drive 1210 that are interconnected by a system bus 1212. The computer system 1200 may also include a communication unit, such as a network interface card (NIC) 1214. The user I/O 1206 may include a keyboard 1216, a pointing device, such as a mouse 1218, and a display 1220. Other user I/O 1206 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1204, which may be a Random Access Memory (RAM), may store a plurality of program libraries or modules, such as an operating system 1222, and one or more application programs that interface to the operating system 1222, such as the program development environment 200 and/or the code generator 300.

The removable medium drive 1210 may accept and read a computer readable medium 1226, such as a CD, DVD, floppy disk, solid state drive, tape, flash memory or other non-transitory medium. The removable medium drive 1210 may also write to the computer readable medium 1226.

Suitable computer systems include personal computers (PCs), workstations, servers, laptops, tablets, palm computers, smart phones, electronic readers, and other portable computing devices, etc. Nonetheless, those skilled in the art will understand that the computer system 1200 of FIG. 12 is intended for illustrative purposes only, and that the present disclosure may be used with other computer, data processing, or computational systems or devices. Aspects of the present disclosure may also be used in a computer network, e.g., client-server, architecture, or a public and/or private cloud computing arrangement. For example, the modeling environment 1200 may be hosted on one or more cloud servers or devices, and accessed by remote clients through a web portal or an application hosting system, such as the Remote Desktop Connection tool from Microsoft Corp.

Suitable operating systems 1222 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1222 may provide services or functions for applications or modules, such as allocating memory, organizing data objects or files according to a file system, prioritizing requests, managing I/O, etc. The operating system 1222 may run on a virtual machine, which may be provided by the data processing system 1200.

As indicated above, a user, such as an engineer, scientist, programmer, developer, etc., may utilize one or more input devices, such as the keyboard 1216, the mouse 1218, and the display 1220 to operate the program development environment 200 and/or the generator 300.

Figure 13:
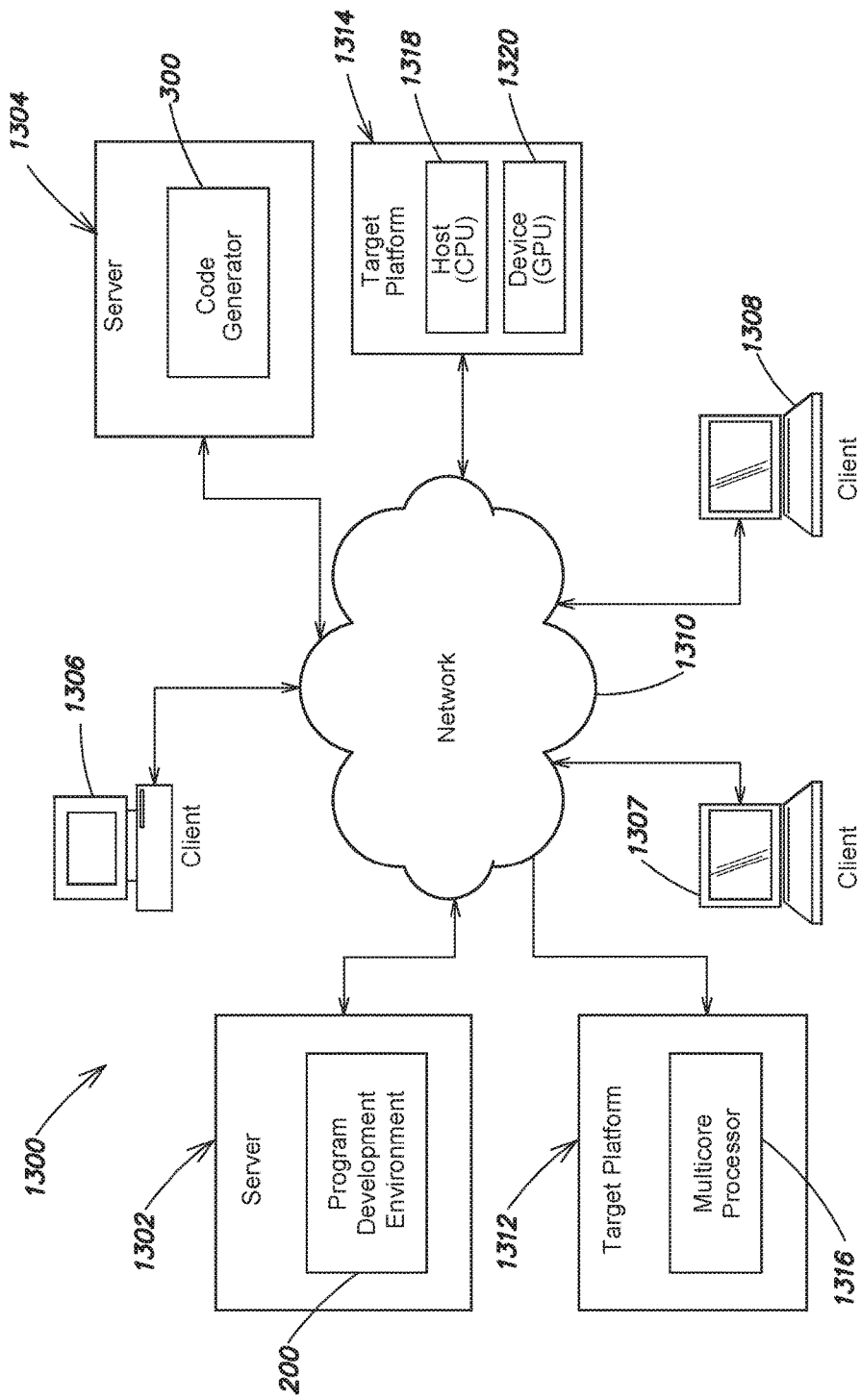
FIG. 13 is a schematic diagram of a distributed computing environment in accordance with an embodiment.

FIG. 13 is a schematic diagram of a distributed computing environment 1300 in which systems and/or methods described herein may be implemented in accordance with an embodiment. The environment 1300 may include client and server devices, such as two servers 1302 and 1304, and three clients 1306-1308, interconnected by one or more networks, such as network 1310. The distributed computing environment 1300 also may include two target platforms 1312 and 1314. Target platform 1312 may include a multicore processor 1316. Target platform 1314 may include a host (Central Processing Unit) 1318 and a device (Graphics Processing Unit) 1320. The servers 1302 and 1304 may include applications or processes accessible by the clients 1306-1308. For example, the server 1302 may run the program development environment 300. The server 1304 may run the code generator 300. The devices of the environment 1300 may interconnect via wired connections, wireless connections, or a combination of wired and wireless connections.

The servers 1302 and 1304 may include one or more devices capable of receiving, generating, storing, processing, executing, and/or providing information. For example, the servers 1302 and 1304 may include a computing device, such as a server, a desktop computer, a laptop computer, a tablet computer, a handheld computer, or a similar device. In some implementations, the servers 1302 and 1304 may host the program development environment 300 and/or the code generator 300.

The clients 1306-1308 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1306-1308 may download data and/or code from the servers 1302 and 1304 via the network 1310. In some implementations, the clients 1306-1308 may be desktop computers, workstations, laptop computers, tablet computers, handheld computers, mobile phones (e.g., smart phones, radiotelephones, etc.), electronic readers, or similar devices. In some implementations, the clients 1306-1308 may receive information from and/or transmit information to the servers 1302 and 1304.

The generated code 226 for the DL network 212 may be deployed on and run by one or both of the target platforms 1312 and 1314.

The network 1310 may include one or more wired and/or wireless networks. For example, the network 1310 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 13 is provided as an example. In practice, there may be additional devices and/or networks, fewer devices and/or networks, different devices and/or networks, or differently arranged devices and/or networks than those shown in FIG. 13. Furthermore, two or more devices shown in FIG. 13 may be implemented within a single device, or a single device shown in FIG. 13 may be implemented as multiple, distributed devices. Additionally, one or more of the devices of the distributed computing environment 1300 may perform one or more functions described as being performed by another device of the environment 1300.

In some aspects, the present disclosure provides a platform abstraction for ease of code generation. There may be a set of functions organized as an API view. In some embodiments, the set of functions of the API (or at least some of the functions) may be arranged in a class hierarchy structure, as described herein. The deep learning code generator may generate code to call this class hierarchy/API layer. For each target platform, there may be a different implementation of the class-hierarchy/API layer that is optimized to the specified target platform. The generated code may embody the same functionality regardless of the particular target platform. However, a code generation package generated by the deep learning code generator may include the generated code together with a particular implementation based on the target platform, thereby creating a high-performance implementation for that target platform.

The following examples implement one or more aspects of methods and/or systems of the present disclosure. These examples are non-limiting examples. Features of different examples may be combined in other implementations. Features of each example may be modified or removed in other implementations.

Aspect 1. A computer-implemented method for automatically generating code (226) adapted for a selected processor architecture, from a source program (212) that implements the deep learning system, the source program including neural network layers and neural network parameters, the method comprising:

storing, in a memory, framework (400) that includes a base layer class type (402) that defines at least one of a setup function, a predict function, or a cleanup function, a plurality of subclass types (404-414) that inherit from the base layer class type, the subclass types providing abstractions of functionality for deep learning network layer types, where the abstractions are independent of the selected processor architecture, and an interface layer (418) that interfaces between the class hierarchy and sets of predefined deep learning functions (231a-c);

generating code (226), by a processor coupled to the memory, for executing the source program on a target platform, the generating including:

generating, by the processor, one or more in-memory intermediate representations (IRs) of the source program (508);

mapping a group of the neural network layers of the source program to respective ones of the subclass types;

adding to the one or more IRs object instantiations of the respective ones of the subclass types that map to the group of neural network layers of the source program, first calls to perform the setup function, the predict function, and the cleanup function on the instantiated objects, and second calls from the instantiated objects to a set of predefined deep learning functions targeting the selected processor architecture via the interface layer; and compiling the IRs into generated code; and linking the set of predefined deep learning functions targeting the selected processor architecture to the generated code.

Aspect 2. The method of aspect 1 wherein the plurality of subclass types of the class hierarchy include:

an input layer subclass type;

a convolution layer subclass type;

an activation function layer subclass type, such as a rectified linear unit (ReLU) layer subclass type, an identity layer subclass type, a Sigmoid layer subclass type, a Tansig layer subclass type, a Tan h layer subclass type, a leaky ReLU layer subclass type, or a clipped ReLU layer subclass type;

a pooling layer subclass type, such as a max-pooling layer subclass type, an average-pooling layer subclass type, or a L2 pooling layer subclass type;

a regularization layer subclass type, such as a cross-channel normalization layer subclass type, a Batch normalization layer subclass type, or a dropout layer subclass type;

a fully connected layer subclass type;

a classification output subclass type; or a regression output subclass type.

Aspect 3. The method of aspects 1 or 2, in particular of aspect 1 wherein a first IR of the one or more IRs includes nodes that correspond to the neural network layers of the source program, the method further comprising:

determining an execution schedule by analyzing the first IR;

identifying two of the nodes of the first IR whose corresponding neural network layers can share a memory buffer; and modifying the first IR or a second IR of the one or more IRs to share the memory buffer between the neural network layers that correspond to the two nodes.

Aspect 4. The method of any of the preceding aspects, in particular of aspect 1 wherein the target host device includes execution units, and a first IR of the one or more IRs includes nodes that correspond to the plurality of the neural network layers, the method further comprising:

creating a dependency graph having elements that represent the nodes of the first IR;

applying a partitioning algorithm to the dependency graph to organize the nodes of the first IR into dense connection structures, wherein the dense connection structures are associated with respective ones of the execution units of the target host device; and assigning the nodes of the first IR to the execution units of the target host device based on the dense connection structures.

Aspect 5. The method of any of the preceding aspects, in particular of aspect 4 wherein the execution units are asynchronous Compute Unified Device Architecture (CUDA) streams of a Graphics Processing Unit (GPU)

Aspect 6. The method of any of the preceding aspects, in particular of aspect 4 wherein the execution units are cores of a multicore Central Processing Unit (CPU).

Aspect 7. The method of any of the preceding aspects, in particular of aspect 1 further comprising:

assigning compile time conditions to the class hierarchy, where the compile time conditionals indicate a data characteristic for the generated code; and implementing the data characteristic in the generated code.

Aspect 8. The method of any of the preceding aspects, in particular of aspect 6 wherein the data characteristic is a data type or a data arrangement.

Aspect 9. The method of any of the preceding aspects, in particular of aspect 7 wherein the data type is one of double precision floating point, single precision floating point, half precision floating point, or fixed point, and the data arrangement is row major or column major.

Aspect 10. The method of any of the preceding aspects, in particular of aspect 1 further comprising:

producing an executable from the generated code;

deploying the executable on the target host device to implement the deep learning system; and executing the executable on the target host device.

Aspect 11. The method of any of the preceding aspects wherein the sets of predefined deep learning functions, include at least one of:

cuBLAS;

cuDNN;

MKL-DNN; or

ARM Compute library.

Aspect 12. The method of any of the preceding aspects further comprising:

separating the neural network parameters from the one or more IRs of the source program (510); and storing the neural network parameters in one or more data structures.

Aspect 13. The method of any of the preceding aspects further comprising:

applying one or more optimizations to other parts of an application program besides a deep learning network.

Aspect 14. The method of any of the preceding aspects wherein the framework is structured as an object-oriented class hierarchy.

Aspect 15. The method of any of the preceding aspects further comprising:

importing the deep learning network from a first format into a second format that is compatible with the framework.

Aspect 16. A computer-readable storage medium comprising instructions which, when executed by a computer, cause the computer to carry out the method of any of the preceding aspects.

Aspect 17. A computer-readable storage medium comprising instructions generated from any of the aspects 1 to 8.

Figure 15:
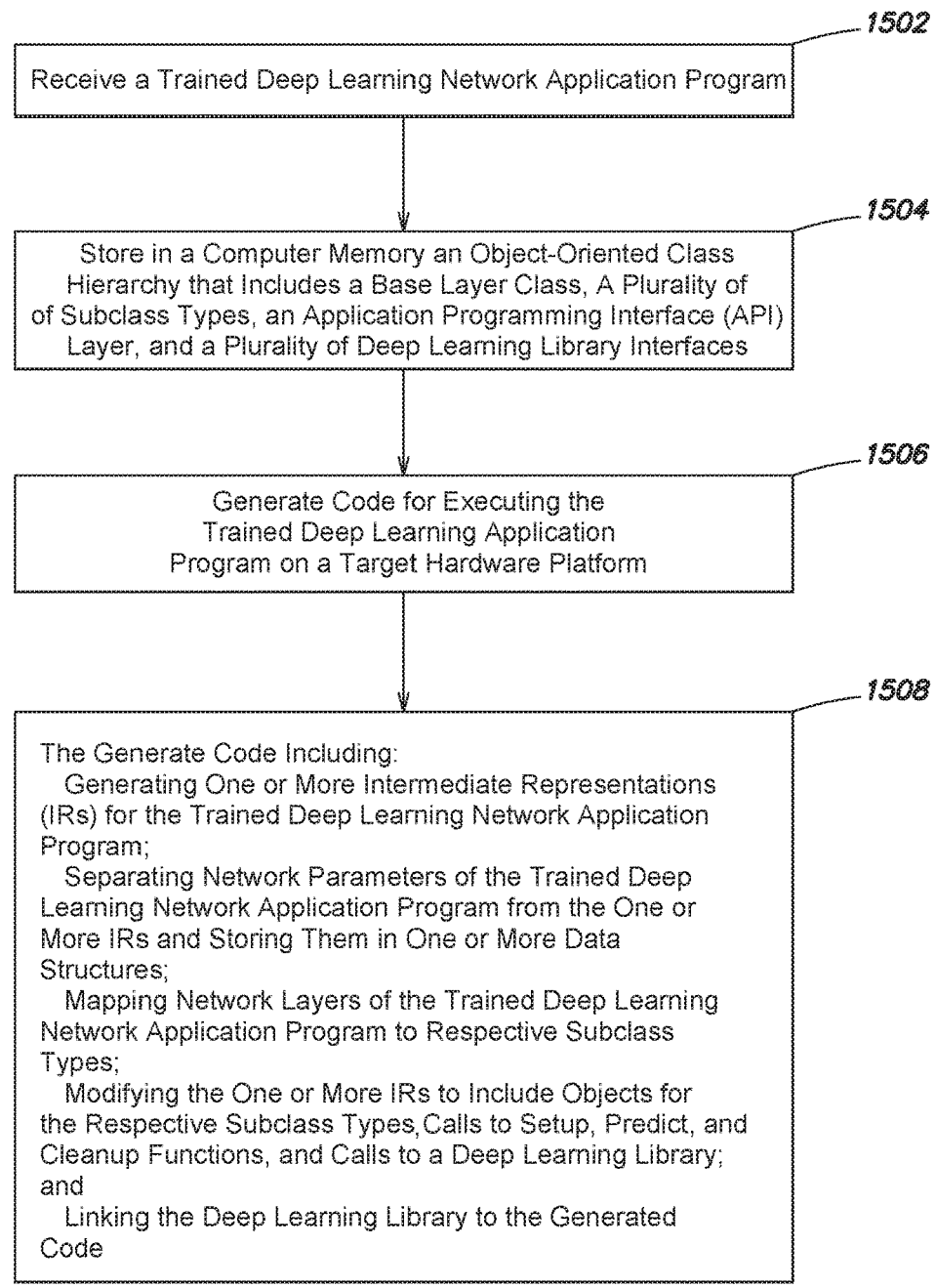
FIG. 15 is a flow diagram of an example method in accordance with an embodiment.

FIG. 15 is a flow diagram of an example method in accordance with an embodiment. The DL code generator 300 may receive a trained DL network application program, as indicated at step 1502. An object-oriented class hierarchy may be stored in a computer memory, as indicated at step 1504. The object-oriented class hierarchy may include a Base layer class and a plurality of subclass types (or subclasses), a target agnostic API layer, and a plurality of deep learning library interfaces. The DL code generator 300 may generate code for the trained DL network application program for execution on a target hardware platform, as indicated at step 1506. As indicated at step 1508, the generating code may include generating one or more in-memory Intermediate Representations (IRs) for the trained deep learning network application program;

separating network parameters of the trained deep learning network application program from the one or more IRs and storing them in one or more data structures;

mapping network layers of the trained deep learning network application program to respective subclass types (or subclasses);

modifying the one or more IRs to include objects for the respective subclass types supporting calls for setup, predict, and cleanup functions and calls to a deep learning library; and linking the deep learning library to the generated code.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, generated code may be utilized advantageously with other embedded hardware. Therefore, it is the object of the appended claims to cover all such variations and modifications as come within the true spirit and scope of the disclosure.

What is claimed is:

1. A method comprising:

for a source program that implements a deep learning network, the deep learning network including network layers and network parameters, storing, in a memory, a framework that includes a base layer class type that defines at least one of a setup function, a predict function, or a cleanup function, a plurality of subclass types of a class hierarchy that inherit from the base layer class type, the plurality of subclass types representing abstractions of functionality performed by deep learning network layer types, where the plurality of subclass types are independent of any particular processor architecture, and an interface layer that interfaces the class hierarchy to sets of predefined deep learning functions, where the sets of predefined deep learning functions are configured for execution at target hardware platforms;

generating code, by a processor coupled to the memory, for executing the source program on a target platform, the generating including:

generating, by the processor, one or more in-memory intermediate representations (IRs) for the source program;

mapping a group of the network layers of the deep learning network to respective ones of the plurality of subclass types;

adding to the one or more IRs statements to instantiate objects for the respective ones of the plurality of subclass types that map to the group of network layers of the deep learning network, and first calls to perform the at least one of the setup function, the predict function, or the cleanup function on the objects, utilizing the one or more IRs to produce the code, where the code includes the objects instantiated in response to the statements and second calls from the objects instantiated in response to the statements to a selected one of the sets of predefined deep learning functions via the interface layer; and linking the selected one of the sets of predefined deep learning functions to the generated code.

2. The method of claim 1 wherein the plurality of subclass types of the class hierarchy includes at least one of:
an input layer subclass type;
a convolution layer subclass type;
an activation function layer subclass type;
a regularization layer subclass type;
a pooling layer subclass type;
a fully connected layer subclass type;
a classification output subclass type; or
a regression output subclass type.

3. The method of claim 2 wherein the activation function layer subclass type is at least one of:
a Rectified Linear Unit (ReLU) layer subclass type;
a Linear layer subclass type;
a Sigmoid layer subclass type;
a Tansig layer subclass type;
a Tanh layer subclass type;
a leaky ReLU layer subclass type; or
a clipped ReLU layer subclass type.

4. The method of claim 1 wherein a first IR of the one or more IRs includes nodes that correspond to the network layers of the deep learning network, the method further comprising:
determining an execution schedule by analyzing the first IR;
identifying two of the nodes of the first IR whose corresponding network layers can share a memory buffer; and
modifying the first IR or a second IR of the one or more IRs to share the memory buffer between the network layers that correspond to the two nodes.

5. The method of claim 1 wherein the target platform includes execution units, and a first IR of the one or more IRs includes nodes that correspond to the network layers of the deep learning network, the method further comprising:
creating a dependency graph having elements that represent the nodes of the first IR;
applying a partitioning algorithm to the dependency graph to organize the nodes of the first IR into dense connection structures, wherein the dense connection structures are associated with respective ones of the execution units of the target platform; and
assigning the nodes of the first IR to the execution units of the target platform based on the dense connection structures.

6. The method of claim 5 wherein the partitioning algorithm is a clique partitioning algorithm, and the dense connection structures are cliques.

7. The method of claim 5 wherein the execution units are asynchronous Compute Unified Device Architecture (CUDA) streams of a Graphics Processing Unit (GPU) or cores of a multicore Central Processing Unit (CPU).

8. The method of claim 1 wherein the sets of predefined deep learning functions, include at least one of:
CUDA Basic Linear Algebra Subprograms (cuBLAS);
CUDA Deep Neural Network (cuDNN);
Math Kernel Library for Deep Neural Networks (MKL-DNN); or
ARM Compute library.

9. The method of claim 1 further comprising:
assigning compile time conditions to the class hierarchy, where the compile time conditionals indicate a data characteristic for the generated code; and implementing the data characteristic in the generated code.

10. The method of claim 9 wherein the data characteristic is a data type or a data arrangement.

11. The method of claim 10 wherein the data type is one of double precision floating point, single precision floating point, half precision floating point, or fixed point, and the data arrangement is row major or column major.

12. The method of claim 1 further comprising:
producing an executable from the generated code; and
deploying the executable on the target platform to implement the deep learning network.

13. The method of claim 1 further comprising:
adding a new subclass type to the class hierarchy, where the new subclass type provides an abstraction of custom functionality for implementing one or more of the deep learning network layer types.

14. The method of claim 1 further comprising:
adding a new subclass type to the class hierarchy, where the new subclass type provides an abstraction of functionality for implementing a new deep learning network layer type.

15. The method of claim 1 further comprising:
revising the class hierarchy to implement new versions of the plurality of subclass types for a new target hardware platform.

16. The method of claim 1 wherein the framework is structured as an object-oriented class hierarchy.

17. The method of claim 1 further comprising:
separating the network parameters from the one or more IRs for the source program;
storing the network parameters in one or more data structures; and
incorporating the one or more data structures storing the network parameters into the generated code.

18. The method of claim 1 further comprising:
importing the deep learning network from a first format into a second format that is compatible with the framework.

19. One or more non-transitory computer-readable media, having stored thereon instructions that when executed by a computing device, cause the computing device to perform operations comprising:
for a source program that implements a deep learning network, the deep learning network including network layers and network parameters,
storing, in a memory, a framework that includes
a base layer class type that defines at least one of a setup function, a predict function, or a cleanup function,
a plurality of subclass types of a class hierarchy that inherit from the base layer class type, the plurality of subclass types representing abstractions of functionality performed by deep learning network layer types, where the plurality of subclass types are independent of any particular processor architecture, and
an interface layer that interfaces the class hierarchy to sets of predefined deep learning functions, where the sets of predefined deep learning functions are configured for execution at target hardware platforms;
generating code, by a processor coupled to the memory, for executing the source program on a target platform, the generating including:
generating, by the processor, one or more in-memory intermediate representations (IRs) for the source program mapping a group of the network layers of the deep learning network to respective ones of the plurality of subclass types;

adding to the one or more IRs statements to instantiate of objects for the respective ones of the plurality of subclass types that map to the group of network layers of the deep learning network, and first calls to perform the at least one of the setup function, the predict function, or the cleanup function on the objects, utilizing the one or more IRs to produce code, where the code includes the objects instantiated in response to the statements and second calls from the objects instantiated in response to the statements to a selected one of the sets of predefined deep learning functions via the interface layer; and linking the selected one of the sets of predefined deep learning functions to the generated code.

20. The one or more non-transitory computer-readable media of claim 19 wherein the plurality of subclass types of the class hierarchy includes at least one of:

an input layer subclass type;
a convolution layer subclass type;
an activation function layer subclass type;
a regularization layer subclass type;
a pooling layer subclass type;
a fully connected layer subclass type;
a classification output subclass type; or
a regression output subclass type.

21. The one or more non-transitory computer-readable media of claim 20 wherein the activation function layer subclass type is at least one of:

a Rectified Linear Unit (ReLU) layer subclass type;
a Linear layer subclass type;
a Sigmoid layer subclass type;
a Tansig layer subclass type;
a Tanh layer subclass type;
a leaky ReLU layer subclass type; or
a clipped ReLU layer subclass type.

22. The one or more non-transitory computer-readable media of claim 19 wherein a first IR of the one or more IRs includes nodes that correspond to the network layers of the deep learning network, the operations further comprising:

determining an execution schedule by analyzing the first IR;
identifying two of the nodes of the first IR whose corresponding network layers can share a memory buffer; and
modifying the first IR or a second IR of the one or more IRs to share the memory buffer between the network layers that correspond to the two nodes.

23. The one or more non-transitory computer-readable media of claim 19 wherein the target platform includes execution units, and a first IR of the one or more IRs includes nodes that correspond to the network layers of the deep learning network, and the operations further comprising:

creating a dependency graph having elements that represent the nodes of the first IR;
applying a partitioning algorithm to the dependency graph to organize the nodes of the first IR into dense connection structures, wherein the dense connection structures are associated with respective ones of the execution units of the target platform; and
assigning the nodes of the first IR to the execution units of the target platform based on the dense connection structures.

24. The one or more non-transitory computer-readable media of claim 23 wherein the partitioning algorithm is a clique partitioning algorithm, and the dense connection structures are cliques.

25. The one or more non-transitory computer-readable media of claim 23 wherein the execution units are asynchronous Compute Unified Device Architecture (CUDA) streams of a Graphics Processing Unit (GPU) or cores of a multicore Central Processing Unit (CPU).

26. The one or more non-transitory computer-readable media of claim 19 wherein the sets of predefined deep learning functions, include at least one of:

CUDA Basic Linear Algebra Subprograms (cuBLAS);
CUDA Deep Neural Network (cuDNN);
Math Kernel Library for Deep Neural Networks (MKL-DNN); or
ARM Compute library.

27. The one or more non-transitory computer-readable media of claim 19 wherein the operations further comprise:

assigning compile time conditions to the class hierarchy, where the compile time conditionals indicate a data characteristic for the generated code; and
implementing the data characteristic in the generated code.

28. The one or more non-transitory computer-readable media of claim 27 wherein the data characteristic is a data type or a data arrangement.

29. The one or more non-transitory computer-readable media of claim 19 wherein the operations further comprise:

producing an executable from the generated code; and
deploying the executable on the target platform to implement the deep learning network.

30. The one or more non-transitory computer-readable media of claim 19 wherein the operations further comprise:

adding a new subclass type to the class hierarchy, where the new subclass type provides an abstraction of custom functionality for implementing one or more of the deep learning network layer types.

31. The one or more non-transitory computer-readable media of claim 19 wherein the operations further comprise:

adding a new subclass type to the class hierarchy, where the new subclass type provides an abstraction of functionality for implementing a new deep learning network layer type.

32. The one or more non-transitory computer-readable media of claim 19 wherein the operations further comprise:

revising the class hierarchy to implement new versions of the plurality of subclass types for a new target hardware platform.

33. The one or more non-transitory computer-readable media of claim 19 wherein the operations further comprise:

separating the network parameters from the one or more IRs for the source program;
storing the network parameters in one or more data structures; and
incorporating the one or more data structures storing the network parameters into the generated code.

34. The one or more non-transitory computer-readable media of claim 19 wherein the operations further comprise:

importing the deep learning network from a first format into a second format that is compatible with the framework.

35. An apparatus comprising:
a memory storing a source program that implements a deep learning network, the deep learning network including network layers and network parameters, and
a framework that includes
a base layer class type that defines at least one of a setup function, a predict function, or a cleanup function,
a plurality of subclass types of a class hierarchy that inherit from the base layer class type, the plurality of subclass types representing abstractions of functionality performed by deep learning network layer types, where the plurality of subclass types are independent of any particular processor architecture, and
an interface layer that interfaces the class hierarchy to sets of predefined deep learning functions, where the sets of predefined deep learning functions are configured for execution at target hardware platforms; and
one or more processors coupled to the memory, the one or more processors configured to:
generate code for executing the source program on a target platform, the generating including:
generate one or more in-memory intermediate representations (IRs) for the source program
map a group of the network layers of the deep learning network to respective ones of the plurality of subclass types;
add to the one or more IRs
statements to instantiate of objects for the respective ones of the plurality of subclass types that map to the group of network layers of the deep learning network, and
first calls to perform the at least one of the setup function, the predict function, or the cleanup function on the objects,
utilizing the one or more IRs to produce the code, where the code includes the objects instantiated in response to the statements and second calls from the objects instantiated in response to the statements to a selected one of the sets of predefined deep learning functions via the interface layer; and
link the selected one of the sets of predefined deep learning functions to the generated code.

36. The apparatus of claim 27 wherein the plurality of subclass types of the class hierarchy includes at least one of:
an input layer subclass type;
a convolution layer subclass type;
an activation function layer subclass type;
a regularization layer subclass type;
a pooling layer subclass type;
a fully connected layer subclass type;
a classification output subclass type; or
a regression output subclass type.

37. The apparatus of claim 36 wherein the activation function layer subclass type is at least one of:
a Rectified Linear Unit (ReLU) layer subclass type;
a Linear layer subclass type;
a Sigmoid layer subclass type;
a Tansig layer subclass type;
a Tanh layer subclass type;
a leaky ReLU layer subclass type; or
a clipped ReLU layer subclass type.

38. The apparatus of claim 27 wherein a first IR of the one or more IRs includes nodes that correspond to the network layers of the deep learning network, and the one or more processors is further configured to:

determine an execution schedule by analyzing the first IR;
identify two of the nodes of the first IR whose corresponding network layers can share a memory buffer; and
modify the first IR or a second IR of the one or more IRs to share the memory buffer between the network layers that correspond to the two nodes.

39. The apparatus of claim 35 wherein the target platform includes execution units, and a first IR of the one or more IRs includes nodes that correspond to the network layers of the deep learning network, and the one or more processors is further configured to:
create a dependency graph having elements that represent the nodes of the first IR;
apply a partitioning algorithm to the dependency graph to organize the nodes of the first IR into dense connection structures, wherein the dense connection structures are associated with respective ones of the execution units of the target platform; and
assign the nodes of the first IR to the execution units of the target platform based on the dense connection structures.

40. The apparatus of claim 39 wherein the partitioning algorithm is a clique partitioning algorithm, and the dense connection structures are cliques.

41. The apparatus of claim 39 wherein the execution units are asynchronous Compute Unified Device Architecture (CUDA) streams of a Graphics Processing Unit (GPU) or cores of a multicore Central Processing Unit (CPU).

42. The apparatus of claim 35 wherein the sets of predefined deep learning functions, include at least one of:
CUDA Basic Linear Algebra Subprograms (cuBLAS);
CUDA Deep Neural Network (cuDNN);
Math Kernel Library for Deep Neural Networks (MKL-DNN); or
ARM Compute library.

43. The apparatus of claim 35 wherein the one or more processors is further configured to:
assign compile time conditions to the class hierarchy, where the compile time conditionals indicate a data characteristic for the generated code; and
implement the data characteristic in the generated code.

44. The apparatus of claim 43 wherein the data characteristic is a data type or a data arrangement.

45. The apparatus of claim 35 wherein the one or more processors is further configured to:
produce an executable from the generated code; and
deploy the executable on the target platform to implement the deep learning network system.

46. The apparatus of claim 35 wherein the one or more processors is further configured to:
add a new subclass type to the class hierarchy, where the new subclass type provides an abstraction of custom functionality for implementing one or more of the deep learning network layer types.

47. The apparatus of claim 35 wherein the one or more processors is further configured to:
add a new subclass type to the class hierarchy, where the new subclass type provides an abstraction of functionality for implementing a new deep learning network layer type.

48. The apparatus of claim 35 wherein the one or more processors is further configured to:
revise the class hierarchy to implement new versions of the plurality of subclass types for a new target hardware platform.

49. The apparatus of claim 35 wherein the one or more processors is further configured to:
- separate the network parameters from the one or more IRs for the source program;
- store the network parameters in one or more data structures; and
- incorporate the one or more data structures storing the network parameters into the generated code.

50. The apparatus of claim 35 wherein the one or more processors is further configured to:
- import the deep learning network from a first format into a second format that is compatible with the framework.

* * * * *

UNITED STATES PATENT AND TRADEMARK OFFICE
CERTIFICATE OF CORRECTION

PATENT NO. : 10,157,045 B2
APPLICATION NO. : 15/816606
DATED : December 18, 2018
INVENTOR(S) : Girish Venkataramani et al.

It is certified that error appears in the above-identified patent and that said Letters Patent is hereby corrected as shown below:

In the Specification

Column 3, Line 39 reads:
"Sigmoid, Tansig, Tan h, leaky ReLU, and clipped ReLU,"
Should read:
--Sigmoid, Tansig, Tanh, leaky ReLU, and clipped ReLU,--

Column 17, Line 56 reads:
"Through operations on the PR 600, the optimization"
Should read:
--Through operations on the PIR 600, the optimization--

Column 19, Line 27 reads:
"function 'n.predice', which calls predict on the individual"
Should read:
--function 'n.predict', which calls predict on the individual--

Column 23, Line 58 reads:
"layer subclass type, a Tan h layer subclass type, a leaky"
Should read:
--layer subclass type, a Tanh layer subclass type, a leaky--

In the Claims

Column 29, Line 5:
Claim 19 reads:
"statements to instantiate of objects for the respective"
Should read:
--statements to instantiate objects for the respective--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,157,045 B2

Column 31, Line 30:
Claim 35 reads:
"statements to instantiate of objects for the respective"
Should read:
--statements to instantiate objects for the respective--

Column 32, Line 50:
Claim 45 reads:
"the deep learning network system."
Should read:
--the deep learning network.--